United States Patent [19]

Halpern et al.

[11] Patent Number: 4,672,637

[45] Date of Patent: Jun. 9, 1987

[54] ADAPTIVE BIT SYNCHRONIZER

[76] Inventors: Peter H. Halpern, 118 Old Hickory Ct., Longwood; Peter E. Mallory, 406 N. Riverside Dr., Edgewater, both of Fla. 32750; Paul E. Hang, R.R. 1, Box 1740, Sanford, Fla. 32771; William M. Koos, Jr., 548 Lake Ave., Altamonte, Fla. 32701

[21] Appl. No.: 760,941

[22] Filed: Jul. 31, 1985

[51] Int. Cl.[4] ........................ H04L 27/22; H03D 3/22

[52] U.S. Cl. ........................................ 375/96; 375/83; 375/87; 375/119

[58] Field of Search ................... 375/120, 96, 87, 110, 375/119, 83, 98; 329/122; 331/1 R

[56] References Cited

U.S. PATENT DOCUMENTS

| | | | |
|---|---|---|---|
| 3,878,334 | 4/1975 | Halpern | 375/118 |
| 4,320,345 | 3/1982 | Waggener | 375/83 |
| 4,584,534 | 4/1986 | Lijphart et al. | 375/83 |

*Primary Examiner*—Benedict V. Safourek

*Assistant Examiner*—M. Huseman

*Attorney, Agent, or Firm*—Laubscher & Laubscher

[57] ABSTRACT

An adaptive bit synchronizer is operable to extract digital data and its associated clock from a transmitted digital signal, and includes a tunable matched filter set for modifying the input signal to correct for deviations in offset and gain, which filter set includes data, transition and derivative matched filters. A sampling device samples the output of the data matched filter for making bit decision and for estimating the reliability thereof. A clock-producing device is connected with the matched filter set for producing at least two clocks, use being made of an optimum phase detector for estimating the time error between the proper clock edge and the actual clock edges. A loop filter circuit smooths the estimates of the proper clock time to generate clock signals, and a device responsive to the average square error of the clock signals varies the loop parameters of the loop filter means to minimize average square phase error.

3 Claims, 26 Drawing Figures

(a) IDEAL PREFILTERS IMPULSE RESPONSE COMP. LIMITED τ = 50 NSEC (b) 4 MBPS NRZ WOULD ADD 5 SUCCESSIVE SAMPLES (c) BEST 4 MBPS BiØ WOULD ADD 1st 2 SAMPLES SUBTRACT LAST 2 LOSES .97 Db (d) BEST 3.2 MBPS NRZ (WITH NO ISI) WOULD ALSO ADD 5 LOSING .97 Db

ADAPTIVE BIT SYNCHRONIZER

BRIEF DESCRIPTION OF THE PRIOR ART

In the published paper "Adaptive Synchronizers" by Peter H. Halpern, ITC, October 1979 pages 514–528, the motivation for adapting loop bandwidth is reviewed. The ideal loopwidth is shown to be a monotonic function of the ratio of two statistical measurements, namely the input SNR and the present uncertainty of proper phase. This is seen from a relatively simple viewpoint of how to combine independent measurements of the same quantity. Experimental results of the adaptive bit synchronizer are compared with a classic bit synchronizer.

It is known in the art that, on the one hand, signal acquisition requires wide bandwidth, and, on the other hand, the holding of lock on in the presence of noise requires a narrow bandwidth. Since both are drastic functions of loop width and since required loop width changes as a function of the environment, the control of loop width is an important consideration in an adaptive bit synchronizer.

A classic formula for acquisition time is given by D. Richman in "Color Carrier Reference Phase Synchronization", Proceedings of IRE, Vol. 42, No. 1, January 1954, pages 106–135, as:

$$T = \frac{4\Delta f^2}{B^3} \tag{1}$$

where T=acquisition time in seconds, Δf is initial frequency offset, and B is loop bandwidth. The curves of FIG. 1 of the drawing bear out the classic relationship of Equation (1).

Similarly a classic formula for mean time to lose lock for a first order loop is given by A. Viterbi in "Principals of Coherent Communication", McGraw Hill, 1966, page 102:

$$T_{AV} = \frac{\pi}{4B}\exp(2\ S/N \text{ in the loop}) \tag{2}$$

In considering the parameters required for measuring loopwidth, the assumption is made that the synchronization essentially averages measurements of the proper phase.

The bandwidth essentially determines the relative weighting of the cumulative old measurements to the incoming new measurements. This relative weighting should depend on the relative uncertainty of the measurements. Only the gross parameters of the loop filters are defined. It is assumed that the detailed spectral shape of the disturbances are of second order effect.

The basic problem of how to adjust the loop bandwidth is closely related to the problem of combining independent measurements of the same quantity, namely proper phase.

One can presume that the accumulation of all the previous measurements of proper phase have associated with them a certain reliability. The present rms error in phase can be measured as well as the incoming signal-to-noise ratio. Therefore, one has an estimate of the rms error of the old measurements $\phi_1$, and the new measurements $\phi_2$. Furtheremore, the experiments on measuring phase error are all presumed independent, and the rms errors in each measurement are respectively $\phi_1$ and $\phi_2$ (The optimum estimator for Gaussian noise is linear and the optimum linear estimator for any noise density has the same weights as the Gaussian).

Suppose the old measurements say that the proper phase was $\phi_1$ and the new measurements say the proper phase is $\phi_2$. Suppose first that the experimental outcomes $\phi_1$ and $\phi_2$ are drawn from Gaussian distributions and one is looking for the most likely $\phi$. Now $$p(\Phi/\phi_1,\phi_2) = p(\phi_1,\phi_2/\Phi)\frac{p_o(\Phi)}{p_o(\phi_1,\phi_2)} \tag{3}$$

That is the probability density that $\Phi$ is the correct phase given the results of the experiments $\phi_1$, $\phi_2$ is the same as the probability of getting the experiments given $\Phi$, was the correct phase times the a priori probabilities $p_o(\Phi)$ divided by the fixed number $p_o(\phi_1,\phi_2)$. Since all phases are a priori equally likely, the problems reduces to finding $\phi$ which maximizes $p_o(\phi_1,\phi_2/\Phi)$. But $$p(\phi_1,\phi_2/\Phi) = \frac{1}{2\pi\sigma_1\sigma_2}\exp\left[-\frac{(\phi_1-\Phi)^2}{2\phi_1^2}-\frac{(\phi_2-\Phi)^2}{2\phi_2^2}\right] \tag{4}$$

This is assuming the experiments are independent.

The $\phi$ which minimizes the exponent in Equation (4) is easily found by taking the derivative and setting it equal to zero and obtaining $$\Phi = \frac{\sigma_2^2}{\sigma_1^2+\sigma_2^2}\phi_1 + \frac{\sigma_1^2}{\sigma_1^2+\sigma_2^2}\phi_2 \tag{5}$$

All this was assuming Gaussianity to find the most likely phase.

It is possible to derive a similar linear estimate without any knowledge of the denisty functions but just knowing their variances. To this end let:

$$\Phi=\alpha\phi_1+(1-\alpha)\phi_2 \tag{6}$$

be a weighted average of the experiments and find the $\alpha$ which minimizes the rms error. To minimize:

$$E=E\{(\phi-Y)^2/\phi_1,\ \phi_2\}=E\{(\phi-\alpha\phi_1-(1-\alpha)\phi_2)\ 2/\phi_1,\phi_2\} \tag{7}$$

where $E\{—/\phi_1,\phi_2\}$ means the expected value over the restricted space (given the results of the experiments)

$$E = E\{\alpha^2(\phi-\phi_1)^2/\phi_1,\phi_2\} + E\{(1-\alpha)^2(\phi_1-\phi_2)^2/\phi_1,\phi_2\} + E\{(1-\alpha)\alpha(\phi_1-\phi)(\phi_2-\phi)/\phi_1,\phi_2\} \tag{8}$$

Since the experiments are independent, Equation (8) simplifies to $$E=\alpha^2\phi_1^2+(1-\alpha)^{22}$$

E is minimized for $$\alpha = \frac{\sigma_2^2}{\sigma_1^2+\sigma_2^2}$$

Substituting in Equation (6) results once again in Equation (5)

$$\Phi = \frac{\sigma_2^2}{\sigma_1^2 + \sigma_2^2}\phi_1 + \frac{\sigma_1^2}{\sigma_1^2 + \sigma_2^2}\phi_2$$

which shows the relative weighting of incoming data vs. stored data.

Regarding optimal filtering theory for adjusting loop-width, the optimum bandwidth is a monotonic function of rms signal jitter to incident noise ratio. Regarding the input frequency variation as a random process and considering the noise disturbance as additive, the optimum loop filter is easily derived.

It is desired to look for the closed loop response which will minimize rms tracking error for a given input jitter and a given additive (independent noise).

For simplicity of discussion the realizability of the optimum filters is disregarded so that one does not need to solve a Wiener Hopf integral equation or perform spectrum factorization. The model of the present invention is used to obtain an idea of the optimal bandwidth only. The optimum filters transfer function is given by:

$$K(w) = \frac{S_m(w)}{S_m(w) + S_n(w)} = \frac{1}{1 + S_n(w)/S_m(w)} \quad (9)$$

where $S_m(w)$ is the input power density spectrum of the jitter and $S_n(w)$ is the noise. ("Extraction of Signals From Noise", by Wanstein and Zubakov, English Translation 1962, Prentice Hall). Equation (9) supports the idea that the optimum bandwidth is a function of the ratio of jitter power to white noise power.

Now to actually measure the detailed shape of $S_n(w)$ and $S_m(w)$ is a rather formidable task. Since it is desired to optimize with respect to several parameters, one measures directly the rms phase jitter obtained for variations in the parameters. No noise or signal model assumptions need be made this way.

SUMMARY OF THE INVENTION

Accordingly, a primary object of the present invention is to provide an improved adaptive bit synchronizer for extracting digital data and its associated clock from a transmitted signal, including tunable matched filter means for modifying the input signal to correct for deviations in offset and gain, which filter means includes data, transition and derivative matched filters, means for generating a data output signal, including sampling means for sampling the output of the data matched filter for making bit decisions and for estimating the reliability thereof, means including loop filter means connected with the matched filter set for producing at least two clocks, and means responsive to the average square error of the clock signals for varying the loop parameters of the loop filter means to minimize average square phase error.

BRIEF DESCRIPTION OF THE DRAWINGS

Other objects and advantages of the invention will become apparent from a study of the following specification when viewed in the light of the accompanying drawings, in which.

DETAILED DESCRIPTION

Figure 1:
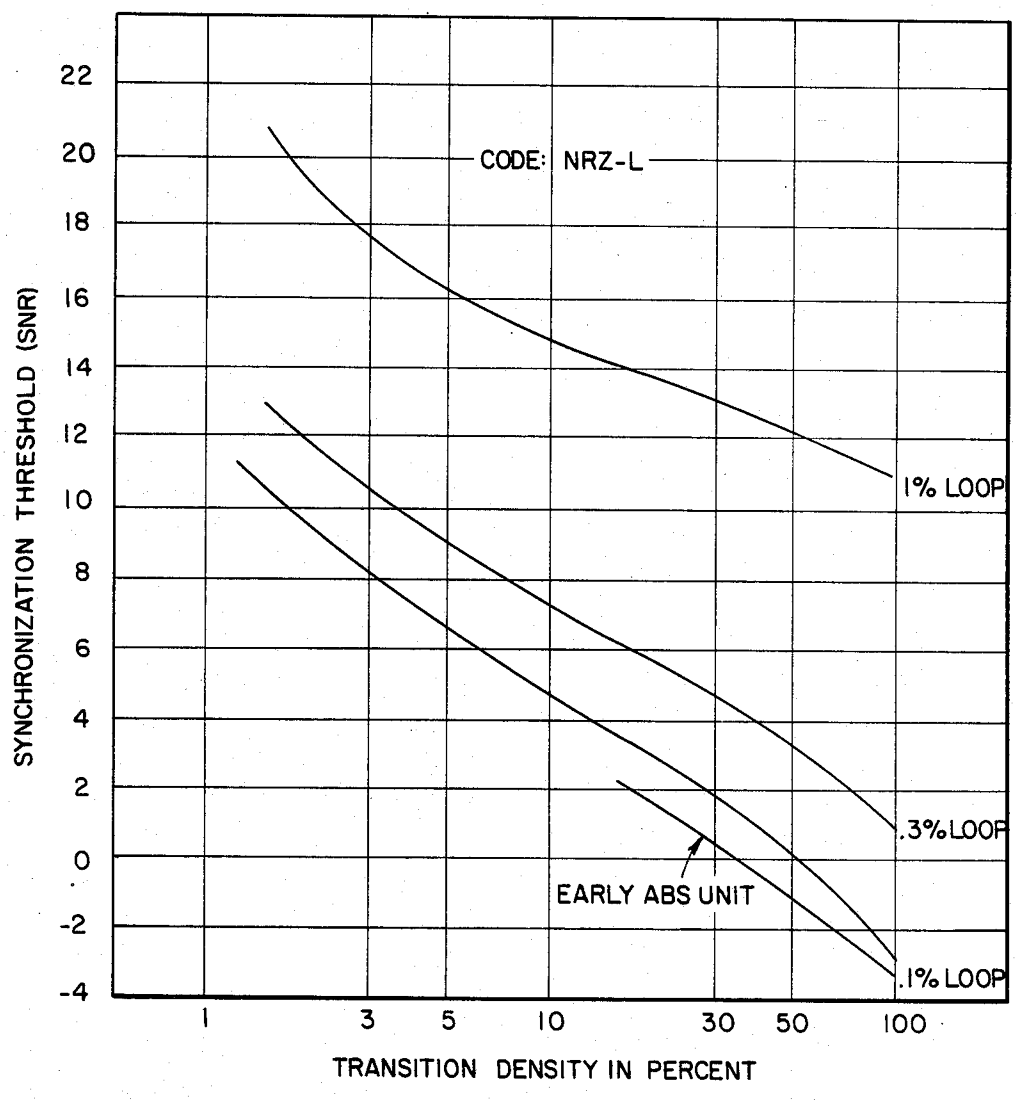
FIG. 1 is a graph showing synchronization threshold (SNR) plotted against transition density in percent, illustrating the dependency of acquisition on synchronization threshold for various loop widths.
Figure 2:
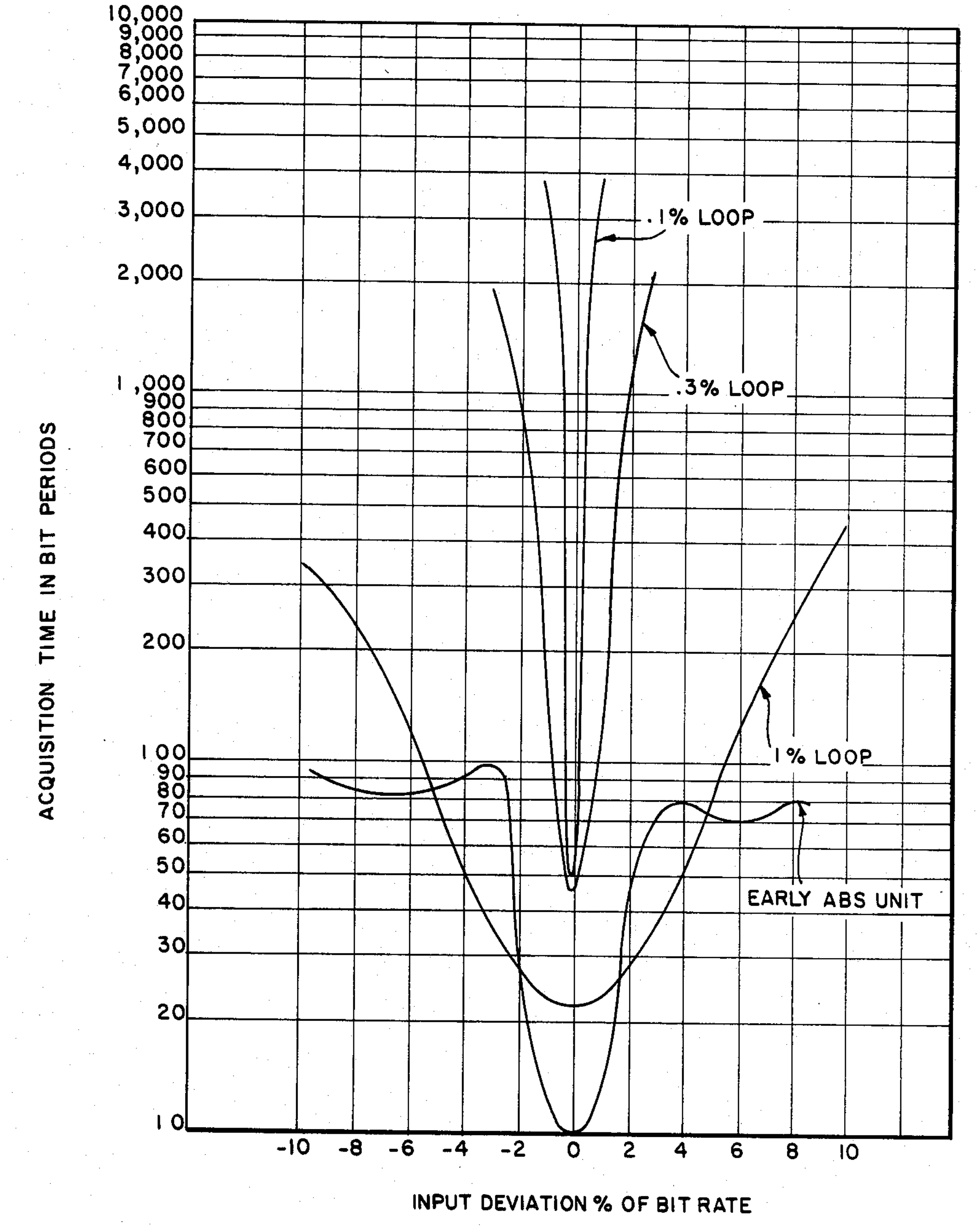
FIG. 2 is a graph showing aquisition time plotted against input deviation, illustrating aquisition dependency on initial frequency error for various loop lengths.
Figure 3:
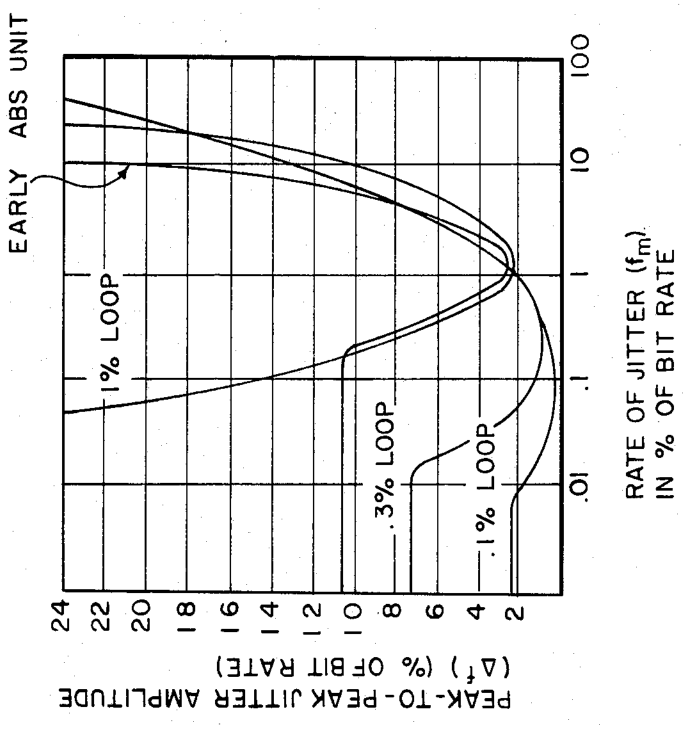
FIG. 3 is a graph showing peak-to-peak jitter amplitude plotted against rate of jitter amplitude plotted against rate of jitter for maintenance of synchronization, showing the dependency of jitter threshold on loop-width.
Figure 4:
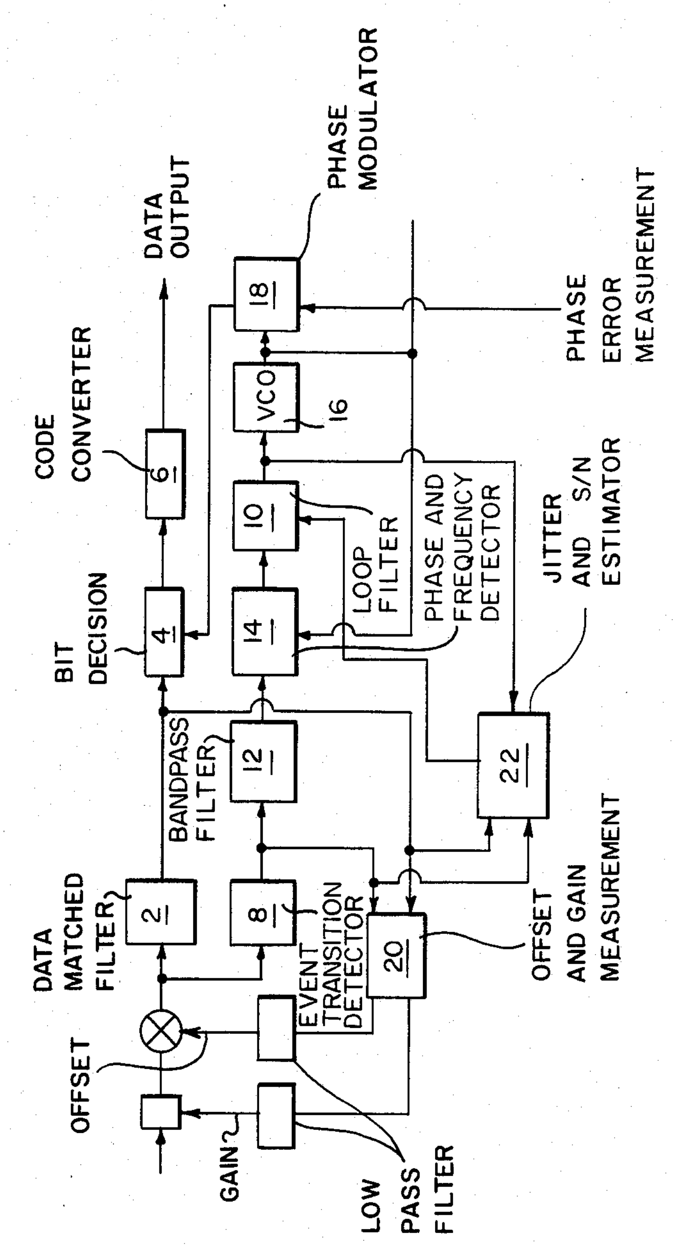
FIG. 4 is a block diagram of an early adaptive bit synchronizer which adapts to all input dynamics.

In the curves of FIGS. 1–3, the performance of the early adaptive bit synchronizer of FIG. 4 have been superimposed. The early adaptive bit synchronizer included a data matched filter 2 for supplying the output data via a bit decision unit 4 and a code converter 6. Event transistion detector 8 is connected with loop filter 10 via bandpass filter 12 and phase and frequency detector 14, thereby to supply a signal to the voltage controlled oscillator 16 connected with one input of phase modulator 18. A phase error measurement signal is supplied to the other input of phase modulator 18, which device is connected with a second input of the bit decision unit 4. The inputs of bandpass filter 12 and bit decision unit 4 are connected with the inputs of both offset and gain measurement unit 20 and jitter and S/N estimator unit 22. A feedback signal from the output of loop filter 10 is fed back to the jitter and S/N estimator which produces a control signal for controlling the loop filter 10. Offset and gain signals are fed back to the input by unit 20.

Figure 5:
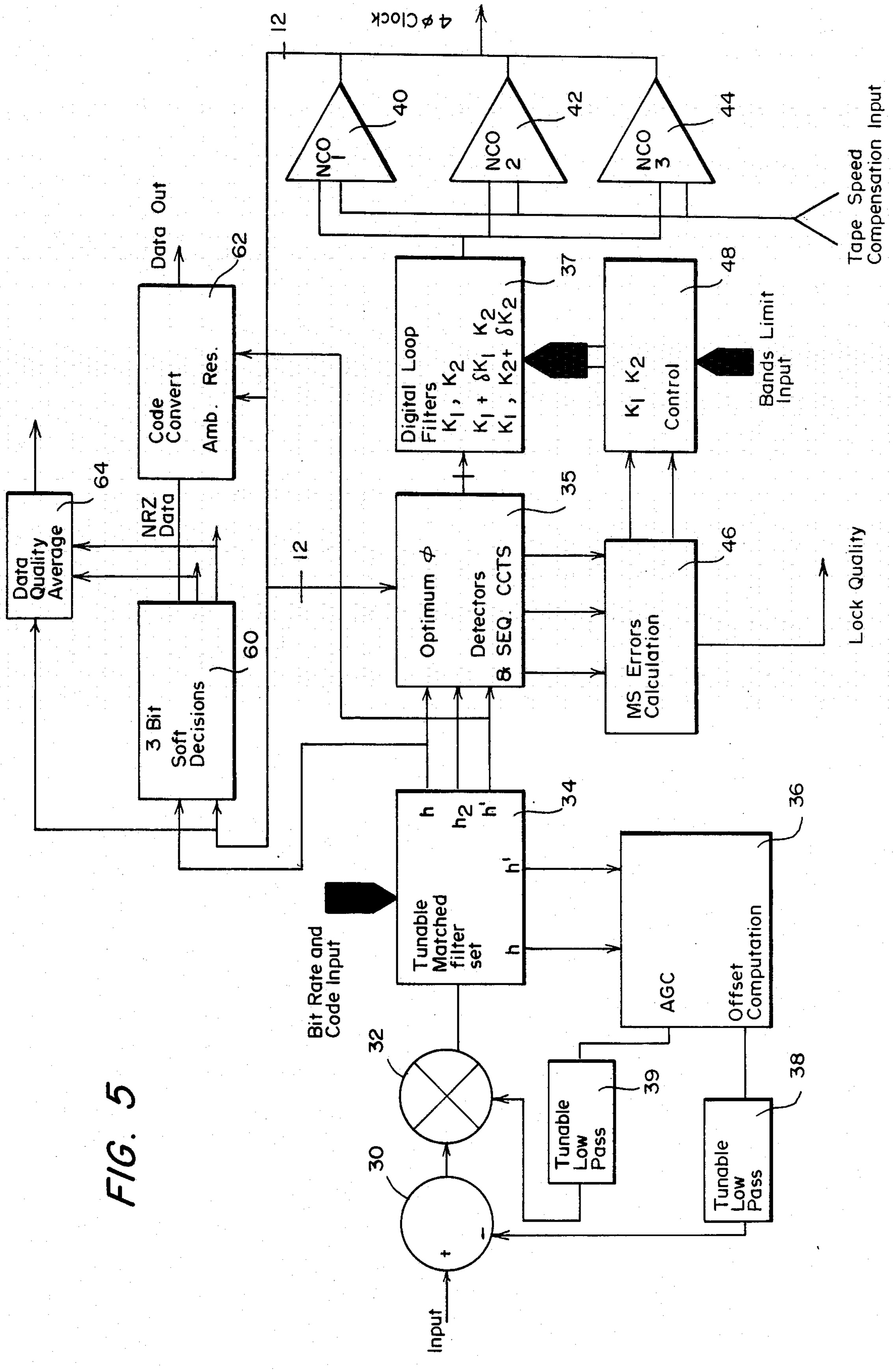
FIG. 5 is a block diagram of the adaptive bit synchronizer of the present invention.

Referring now to the improved adaptive bit synchronizer of the present invention illustrated in FIG. 5, a transmitted digital signal containing digital data and its associated clock is supplied via offset and gain correcting devices 30 and 32, respectively, to one input of tunable matched filter set 34, another input being supplied with a bit rate and code input signal. A pair of output signals (h, h') from the matched filter set 34 are supplied to the automatic gain control unit 36 which supplies the offset and gain correcting devices via tunable low pass filters 38 and 39, respectively. Three outputs (h, $h_2$ and h') of the matched filter set are supplied to the inputs of the optimum phase detector means 35 that in turn supplies loop filter means 37 having an output connected with one set of inputs of the numerically controlled oscillators 40, 42 and 44. A tape speed compensation input signal is supplied to the other inputs of the numerically controlled oscillators. The optimum phase detector and sequencing circuit means 35 also includes output terminals connected with MS errors calculating device 46 that supplies and output signal to the $K_1K_2$ parameter control device 48 having a further input to which is supplied the bands limit input signal 50. The output from the parameter control device is supplied to the loop filter 38.

The output terminal h of the matched filter set 34 is connected with one input terminal of the 3-bit soft decision means 60 which supplies NRZ data to the code converter 62 from which the data output signal is obtained. An output signal from the numerically controlled oscillators is supplied to inputs of the 3-bit soft decision means 60, the code converter 62 an the data quality average 64, and the output terminal h' from the matched filter set 34 is supplied to another input of the code converter 62. The data quality average device 64 is also supplied with outputs from the 3-bit soft decision device 60.

Regarding the operation of the circuit of FIG. 5, since the input normally has voltage offset and gain variation, these disturbances are removed early in the signal processing. For NRZ data, the DC offset can only be measured when there is a data transition. If one attempted to AC couple or, what is the same thing, just subtract off the average DC, the system would become sensitive to data sequences that had many more ones than zeroes or many more zeroes than ones. Therefore, the DC is measured coherently with data transitions. The AGC is required only to keep the signal in the systems dynamic range and to make correct soft decisions.

The signal is then passed through the data matched filter means 34. The matched filters are designed to maximize peak signal to noise ratio to make the best possible decisions. The derivative matched filter is used which is called for in the maximum likelihood $\phi$ estimation.

The matched filters and the derivatives 34 are the key elements in the system of the present invention. They are used for data detection phase error measurement, AGC and offset measurement, data quality estimation and phase ambiguity and false lock detection.

The phase error is measured, processed and filtered through three different phase locked loops (PLL). The two phase locked loops are used solely for measuring the gradient of mean square phase error with respect to loop parameters. These measurements serve to directly adapt the loop parameters to the environment without ever having to model the environment. The loop parameters are also subject to externally applied constraints.

Simple sequential circuits are used for data code conversion and for breaking false locks which could occur for pattern data.

Considering now the design of the matched filter means 34, an all digital matched filter is impractical for the tuning range under consideration. A 5 pole refined matched filter approximation is used Bi$\phi$, NRZ and RZ and their derivatives all using a common denominator.

Figure 6:
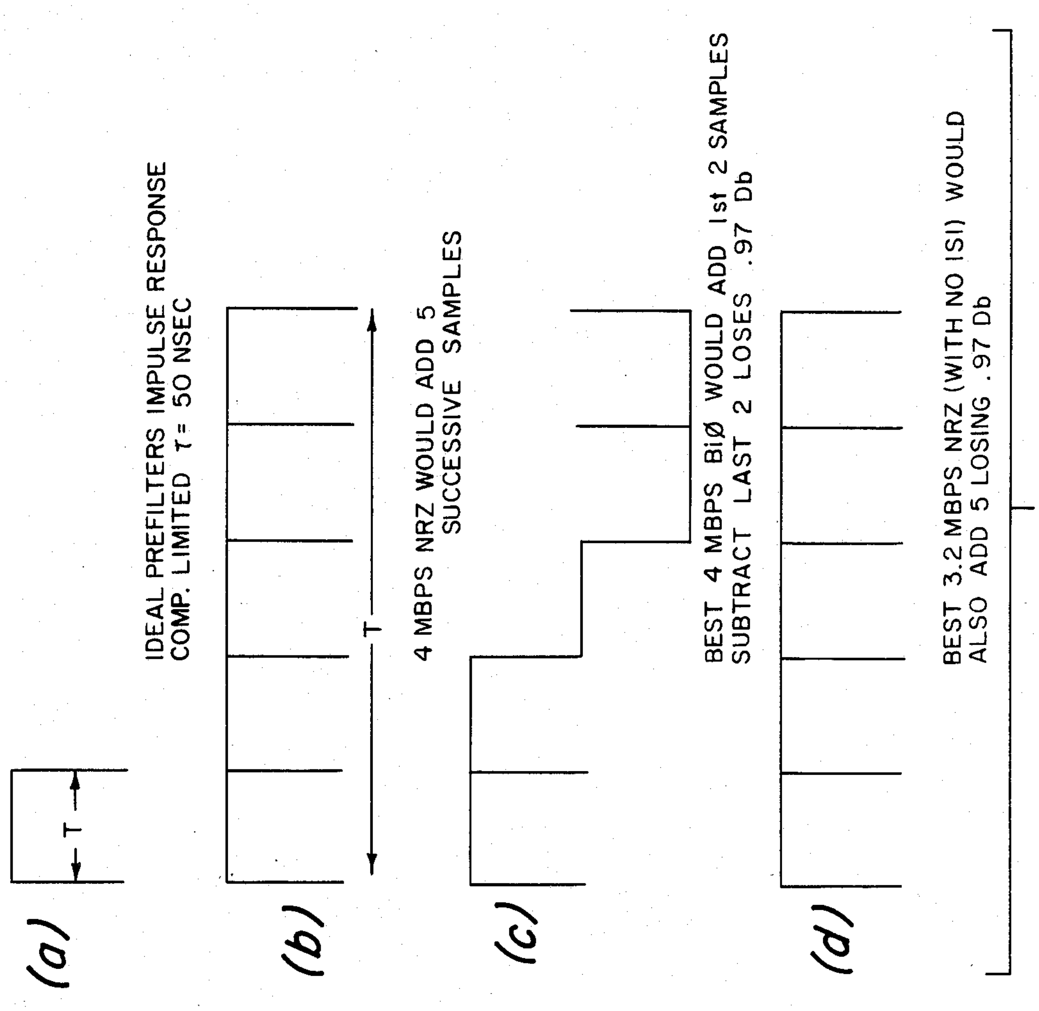
FIGS. 6 (*a–d*) illustrates the effective impulse response which is a weighted sum of the delayed version of the prefilter impulse response.

In order to evaluate the performance of a digitally realized matched filter, one must first recognize that any digital filter has an effective impulse response which is a weighted sum of delayed versions of its prefilters impulse response. Such a prefilter is required for anti-aliasing. FIG. 6 depicts the situation. The maximum sample rate must allow for computation between samples for addition, subtraction and possibly multiplication.

For high speed computation, a practical limit is about 50 nsec. For the highest data rate of the present invention, the optimum prefilter would have a box car response of 50 nsec and one would simply add 5 successive samples together making a net box car 250 nsec wide. If it were to be necessary to make 4 megabit Bi$\phi$, the best method would be to add the first two samples, ignore the third and subtract the last two. The attendant loss in SNR is nearly 1 db. Similarly, if the same prefilter were to be used and a matched filter were to be digitally constructed to 3.2 MBPS NRZ, the best choice is to sum 5 successive samples (a 6th sample would cause errors due to the intersymbol interference). Again one would lose 0.97 db.

If the sample rate could be boosted to Y=4.17 nsec, then the net penalty would be reduced to about 0.8 db, and if the same time could be reduced to 31.25 nsec, a penalty of 0.6 db might be expected. This loss does not leave enough margin for any other non idealities. For example, the prefilter itself has an approximation error. One could reduce the penalties further by going to ECL or to parallel computation both of which are not cost effective in hardware reduction.

It has been decided to use active RC synthesis. One remaining alternative is a hybrid approach where the prefilter is tuned over a small range and digital filters are used for the entire range. We must point out that careful active RC realization has already been proven to work in existing equipment up to 10 MBPS. Even higher frequencies are possible wit integrated circuits.

Consideration will now be given to the function and network synthesis of these matched filters, following the techniques of "The Use of Matched Filters for Synchronization", by P. H. Halpern, Invited Paper at ITC, October, 1972, and "Trigonometric Pulse Forming Networks Revisited", by P. H. Halpern, IEEE, Professional Group on Circuit Theory, January 1972.

The Laplace transform of the impulse response of a matched filter for NRZ at unit bit rate reads:

$$H_1(S) = \frac{1}{S}(1 - l^{-s}) = \frac{2/S}{1 + \coth(S/2)} \qquad (10)$$

while that for Bi$\phi$ is given by $$H_2(S) = \frac{1}{S}\left(1 - 2l^{\frac{-s}{2}} + l^{-s}\right) \qquad (11)$$

-continued $$= \frac{4}{S}\ \frac{\sinh^2(S/4)/\sinh(S/2)}{1 + \coth(S/2)}$$

RZ matched filters can be constructed by retuning an NRZ to twice bit rate or by taking the difference $H_1 - H_2$.

Most of the bit synchs in the field use a 4 pole approximation to coth S/2. We are going to refine this a little bit using a pole residue approximation corrected to produce zeroes at $S^2 = \pi^2$ and $S^2 = 9\ \pi^2$.

$$\text{Coth}\ (S/2)\ \frac{2}{S} + \frac{4S}{S^2 + 4\pi^2} + \frac{46S/3}{S^2 + 24\pi^2} \qquad (12)$$

The last term on the RHS of (12) corrects the pole-residue approximation to produce the zeroes at $S^2 = -\pi^2$ and $S^2 = -9\pi^2$, as can be verified directly or by following the procedure in the aforementioned Halpern IEEE paper. This 5 pole approximation is expected to be 0.1 db better than the 4 pole approximation for NRZ and about 0.4 db for Biφ. The numerator for Biφ will also use a pole residue expansion with end point correction to produce a zero at $S^2 = -16\pi^2$.

$$\frac{4\sinh^2(S/4)}{S\sinh(S/2)}\ \frac{4}{S}\ \frac{4S}{S^2 + 4\pi^2} + \frac{46S/3}{S^2 + 24\pi^2} \qquad (13)$$

The overall transfer functions for NRZ or Sφ are $$H_1(S) = \frac{2/S}{1 + \frac{2}{S} + \frac{4S}{S^2 + 4\pi^2} + \frac{46S/3}{S^2 + 24\pi^2}} \qquad (14)$$

$$H_2(S) = \frac{\frac{16}{S^2 + 4\pi^2} + \frac{32/3}{S^2 + 24\pi^2}}{1 + \frac{2}{S} + \frac{4S}{S^2 + 4\pi^2} + \frac{46S/3}{S^2 + 24\pi^2}} \qquad (15)$$

respectively.

Figure 7:
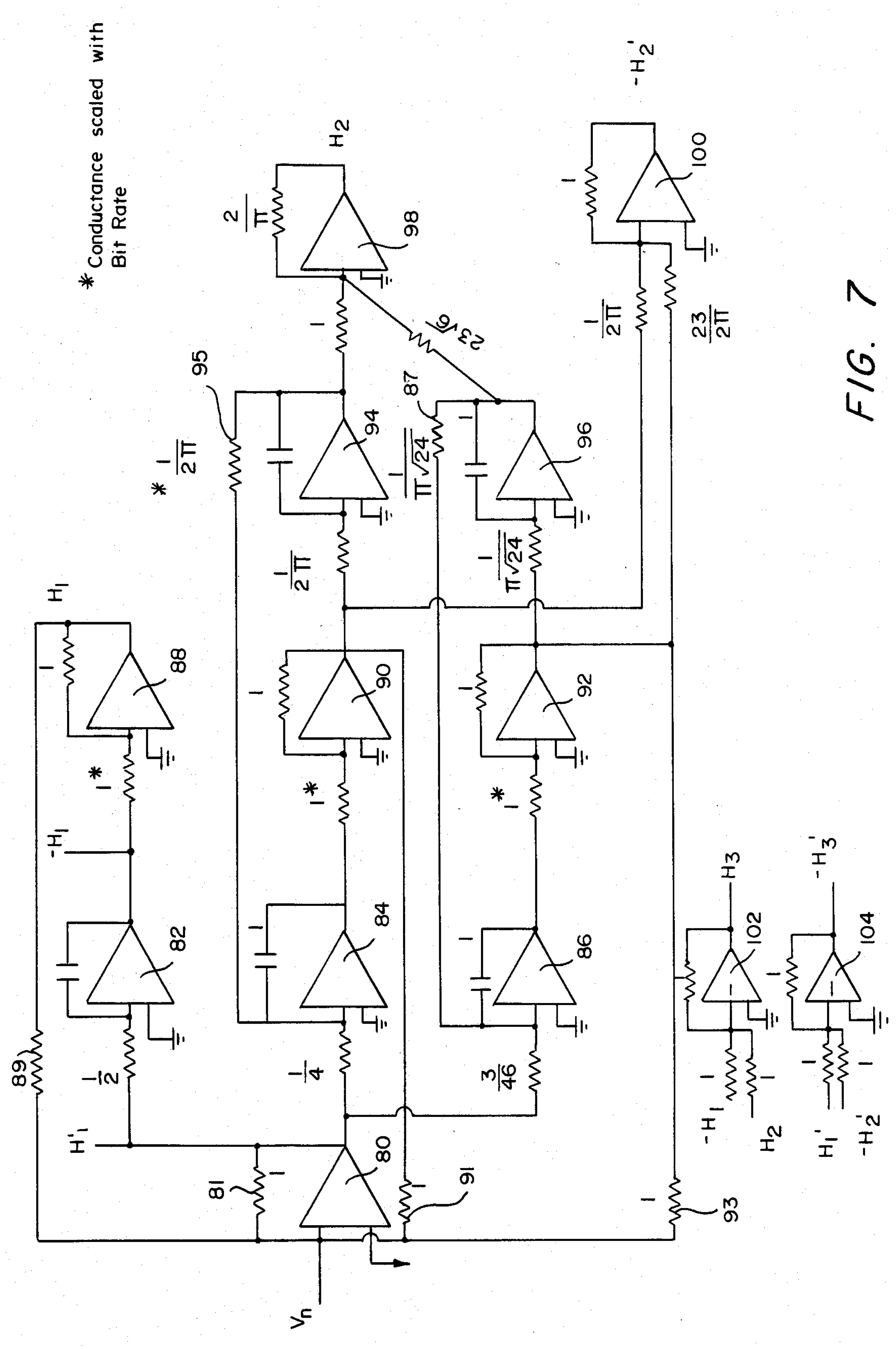
FIG. 7 is an electrical schematic diagram illustrating the simultaneous low sensitivity synthesis of the matched filters with derivatives.

A low sensitivity direct simulation active RC realization is depicted in FIG. 7 for a normalized bit rate and impedance level. Various mods are made for the hi frequency response, for example −1 amplifiers are hard to make stable, and one uses −3 and rescales some of the input resistors. For a marginal extra cost, the approximation can be extended to 7 pole.

The resistors are switched and are coded to minimize the maximum percentage error over the ranges 1 BPS to 2 KBPS, and the capacitors are switched to cover same geometric range 2 KBPS to 4 MBPS.

Tuning accuracy to 1.3% of the filters will in itself cause a maximum error of about 0.06 db and is surely sufficient (10 log 0.987 = −0.057 db).

Figure 10:
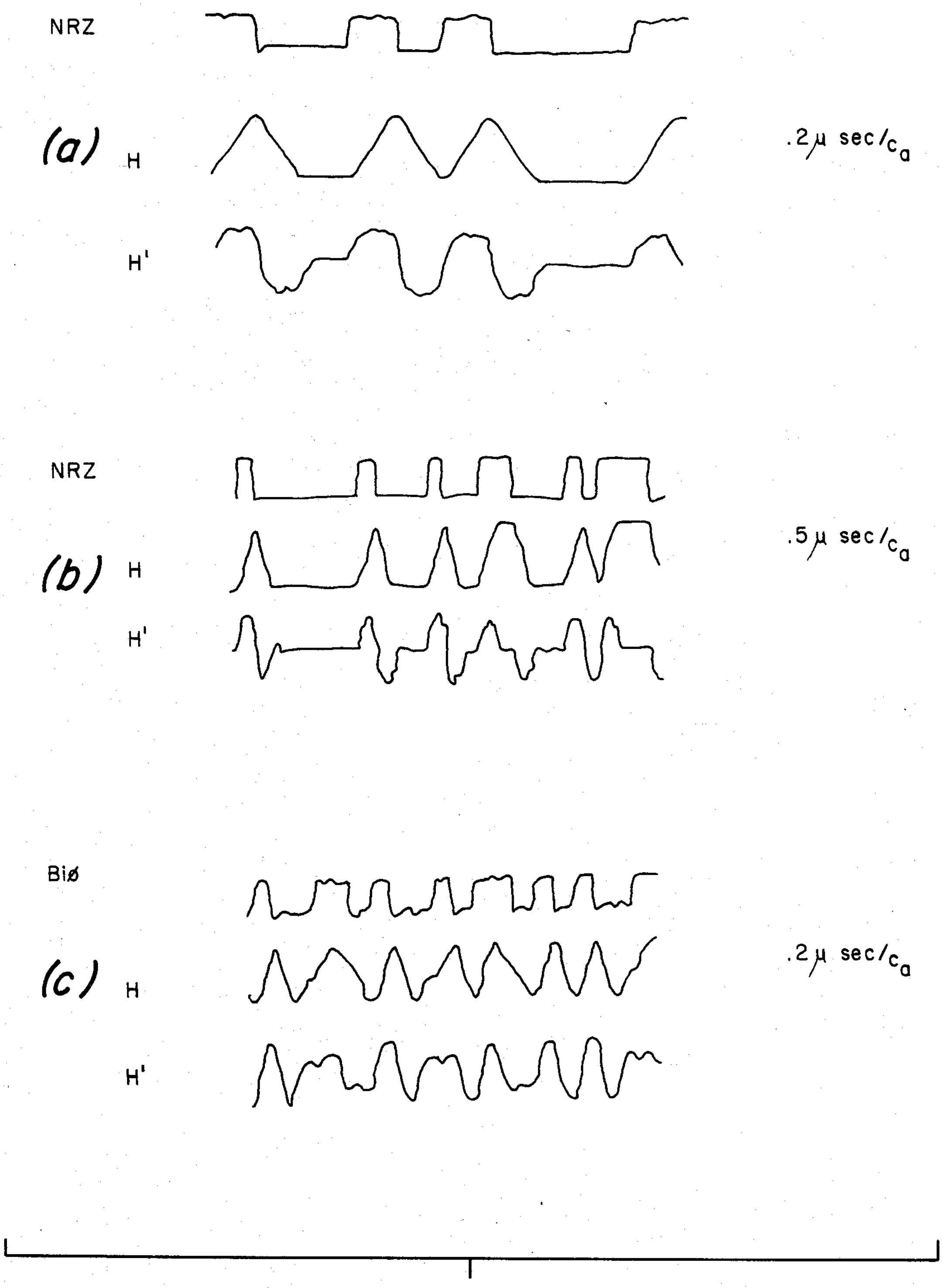
FIGS. 10 (*a–c*) are waveform diagrams of the actual filter response.

The design procedure for constructing conductance multiplier to cover the range 1 to $2\times10^3$ within 1.3% relative error will be discussed below, and actual waveforms of a lower order approximation are shown in FIG. 10.

The operational amplifiers (80, 82, 84, 86, 88, 90, 92, 94, 96, 98, 100) required in this matched filter system are very high speed LH0132, 500 v/usec 70 MHZ FET input.

Considering now the accuracy of the matched filters, the differences in peak signal from the approximate matched filter can be calculated in either the frequency domain or the time domain.

Assume that the unit NRz or Biφ is $l_o(t)$, and that the time reverse impulse response is $h_1$ (t), whereupon the idealized signal to noise ratio, $E_B/N_o$ is $$\rho_o = \frac{(\int l_o^2 dt)^2}{N_o \int l_o^2 dt} = \frac{\int l_o^2 dt}{N_o} \qquad \text{(A-1)}$$

Now the peak signal squared to noise ratio out of the approximate matched filter reads $$\rho_1 = \frac{(\int l_o l_1 dt)^2}{N_o \int l_1^2 dt} \qquad \text{(A-2)}$$

and the loss in SNR is $$\propto\ = 10 \log \frac{\rho_1}{\rho_o} = 10 \log \left[ \frac{(\int l_1 l_o dt)^2}{\int l_1^2 dt} \right] \qquad \text{(A-3)}$$

for normalized $\int l_o^2 dt$.

The calculation is as easily made in the frequeny domain.

$$\propto\ = 10 \log \left[ \frac{(\int H_1 H_o^* dw)^2}{\int H_o H_o^* dw} \right] \qquad \text{(A-4)}$$

For the 5 pole NRZ approximation one uses $H_1$ of (14) and for Biφ one uses instead $H_2$ of (15). For $H_o$ the NRZ case one uses $(1-1^{-s})/S$ for Biφ, and $1/S[1-21^{-s/2}+1^{-s}]$ for $H_o$.

The standard bit synchs common in the industry use for NRZ $$H(S) = \frac{2/S}{1 + \frac{2}{S} + \frac{4S}{S^2 + 4\pi^2} + \frac{2S}{3\pi^2}} \qquad \text{(A-5)}$$

and for Biφ

$$H(S) = \frac{\frac{8}{S^2 + 4\pi^2}}{1 + \frac{2}{S} + \frac{4S}{S^2 + 4\pi^2} + \frac{2S}{3\pi^2}} \qquad \text{(A-6)}$$

A comparison of the results produces:

| Approximation by the Present Invention | Industries Bit Synch |
|---|---|
| $\propto_{NRZ} = .24$ db | $\propto_{NRZ} = .33$ db |
| $\propto_{Bi\phi} = .60$ db | $\propto_{Bi\phi} = 1.0$ db |

Consideration will now be given to the design of the conductance multipliers for the range 1 to $>2\times10^3$.

It turns out with 16 switches a conductance can be synthesized to within 1.3% of any number between 1 and 2000.

Let ε be the tolerance in general. A fixed conductance $G_o = 1+\epsilon$ is "soldered in" which without any other conductance added will cover the range G = 1 to $1+2\epsilon$. For the value $1 = 2\epsilon^+$ one needs a total conductance of $(1+2\epsilon)G_o$ but the additional amount will be $2\epsilon G_o$. In general, an additional conductance $G_{n+1}$ must be switched in to cover the range in excess of $$G > (1 + \epsilon) \sum_{o}^{n} G \tag{A-7}$$

The largest $G_{n+1}$ that can be used without there being a tolerance gap for G is $$G_{n+1} > (1 + 2\epsilon) \sum_{o}^{n} G_n - G_o \tag{A-8}$$

the discrete equation may be solved in closed form obtaining $$G_o = 1 + \epsilon \text{ for } n \geqq 1 \; G_n = (2 + 2\epsilon)^n \tag{A-9}$$

resulting in the following conductance scale factors

| | |
|---|---|
| Fixed $G_0$ = 1.013 | |
| $G_1$ = .026338 | $G_9$ = 7.4765 |
| $G_2$ = .053361 | $G_{10}$ = 15.147 |
| $G_3$ = .10811 | $G_{11}$ = 30.689 |
| $G_4$ = .21903 | $G_{12}$ = 62.175 |
| $G_5$ = .44375 | $G_{13}$ = 125.97 |
| $G_6$ = .89904 | $G_{14}$ = 255.21 |
| $G_7$ = 1.8215 | $G_{15}$ = 517.05 |
| $G_8$ = 3.6903 | $G_{16}$ = 1047.5 |

Combinations of these conductances will cover the range from 1 to 2015.

For any given desired frequency (conductance scale) conductances which are switched in are determined by successive subtraction in the microprocessor. The op amp synthesis permits the scaling of resistors by 2000 to one.

Note that if decimal coded conductances to go from 1 to 1000 within 1.3% had been used there would be required 5 decades +1 conductance or 21 resistors, with their associated relays.

In developing the ideal control signals, the maximum likelihood synchronizer utilizes samples of the data matched filter (H,) and its derivatives (H'). Operations on H and H' will also yield short term estimates proportional to phase error useful for estimating performance. Operations on H and H' yield offset and AGC controls. The derivation of the maximum likelihood synchronized is set forth in "A Maximum Likelihood Bit Synchronizer", by P. E. Mallory, ITC, October 1968, pages 1-14. Some of the key ideas are repeated here.

Let h(t) be the ideal transmitted signal received with unknown polarity. Assuming single baud observation for the moment and considering the probabality density of receiving r(t) in Gaussian noise given $\tau$ is the right sample point;

$$p(r(t)/\tau) = \frac{.5}{2\pi N_o}\left[\exp\frac{-1}{2N_o}(r - h(\tau - t))^2 dt + \exp\frac{-1}{2N_o}(r + h(-t))^2 dt\right] \tag{16}$$

The part of (16) which is dependent on $\tau$ can be abbreviated $$p(r(t)/\tau) = K\cosh\frac{1}{N_o}\left(\int r(t)h(\tau - t)dt\right)\tau \tag{17}$$

The probability densities of observing r(t) over several independent bits or observation intervals multiply, their log probabilities add.

Since the loop filter more or less accumulates the control signal controller C may be written as:

$$C = \frac{\partial Lnp(r(t)/\tau}{\partial\tau} = \frac{p(r/\tau)}{\partial\tau} / p(r/\tau) \tag{18}$$

$$C = \frac{H'}{N_o}\tanh(h/N_o) \tag{19}$$

Where H is the output of the data matched filter $$H = \int r(t)h(\tau - t)dt \tag{20}$$

and H' its derivative $$H' = \int r(t)h'(\tau - t)dt \tag{21}$$

The function tanh $(H/N_o)$ is recognized as soft limiter as shown in the sketch below

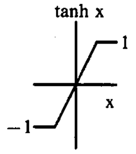

It can be approximated by a hard limiter at any reasonable SNR.

Figure 8:
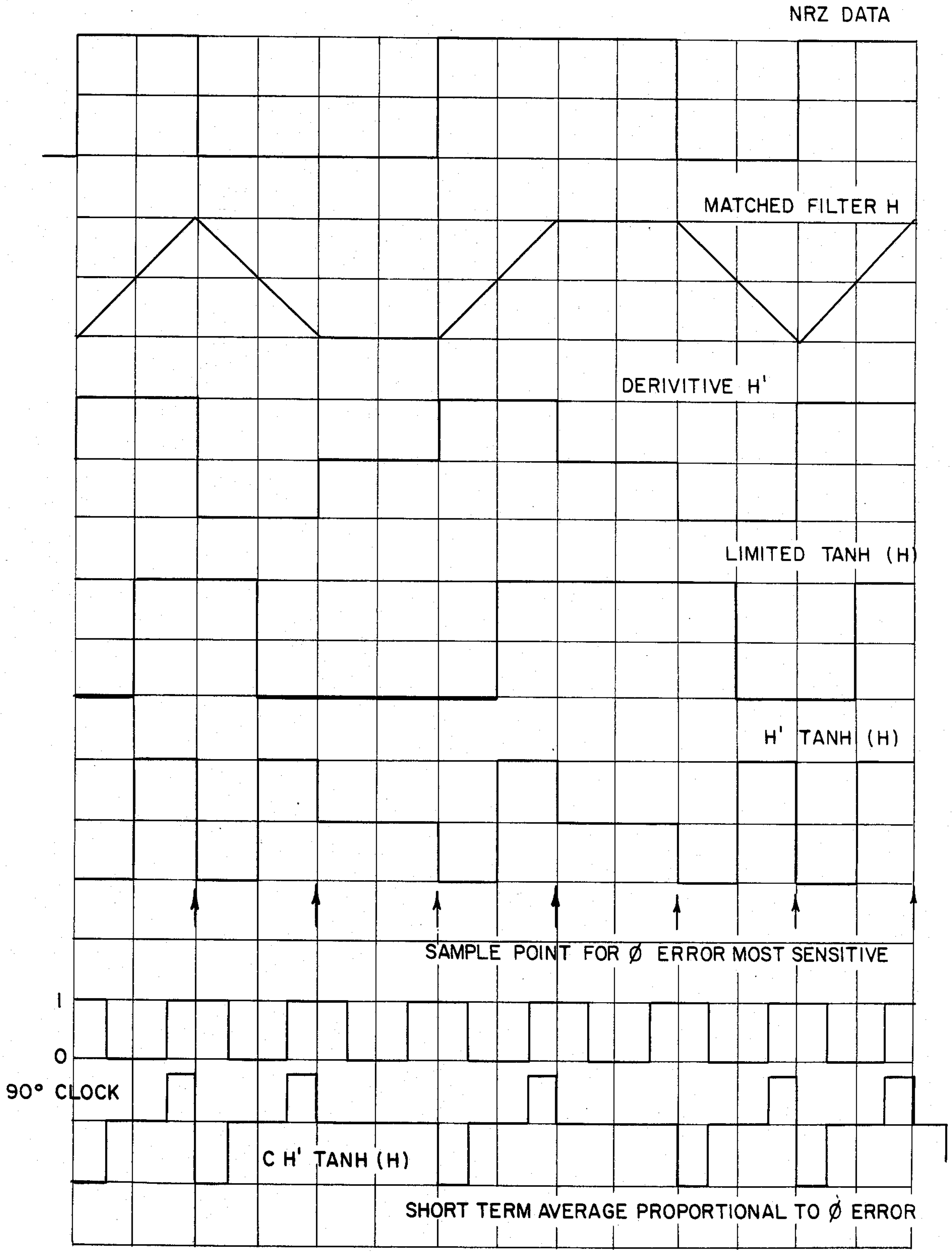
FIGS. 8 and 9 are timing diagrams for NRZ and Bi$\phi$, respectively.
Figure 9:
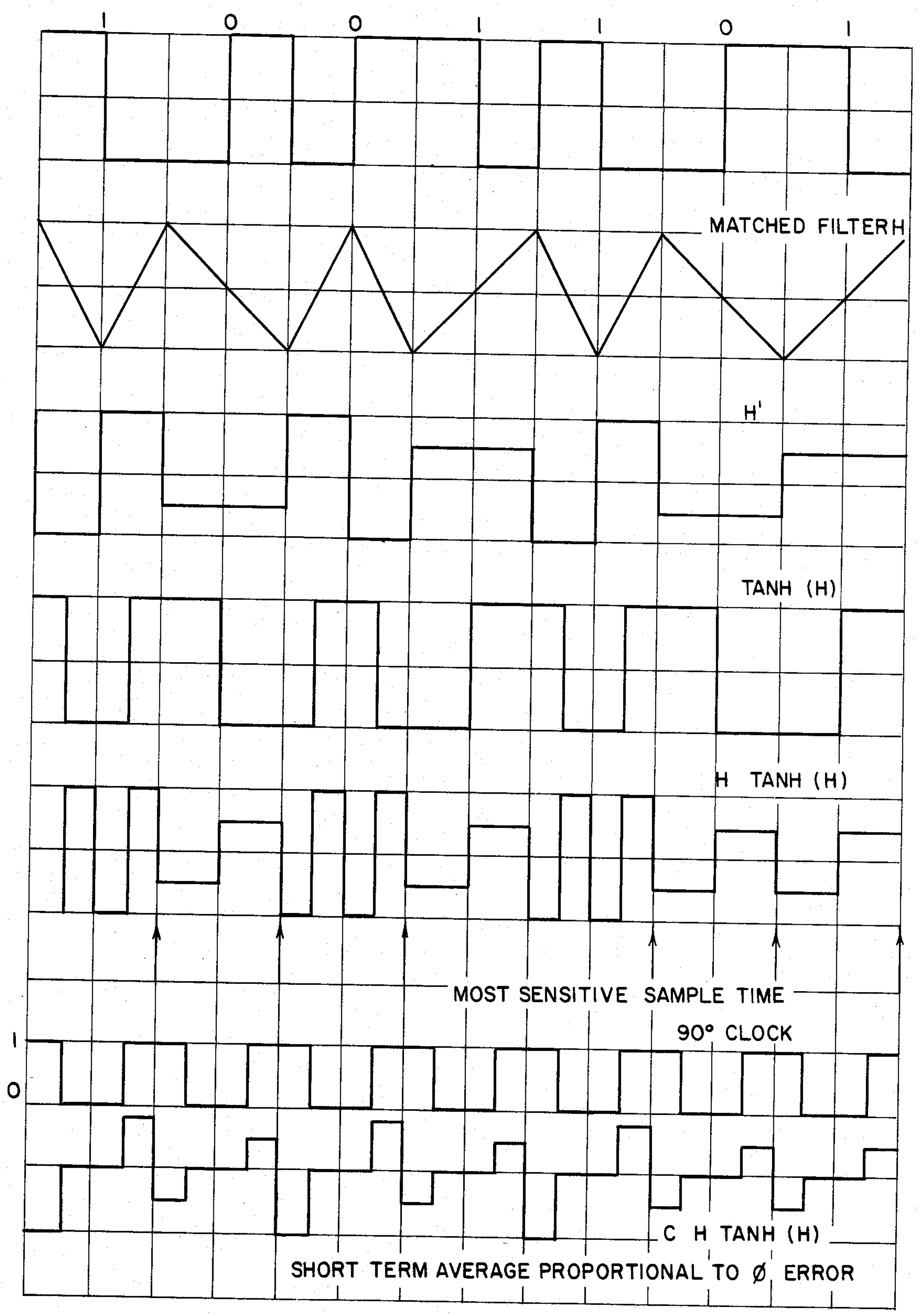

Timing diagrams are depicted in FIG. 8 for NRZ and FIG. 9 for Bi$\phi$. The data clock samples H' tanh $(H/N_o)$. When one is near the correct sampling time one has, as might be suspected from the theory, a very sensitive control. Actual filter responses are shown in FIG. 10 for 5 MBPS data.

Figure 11:
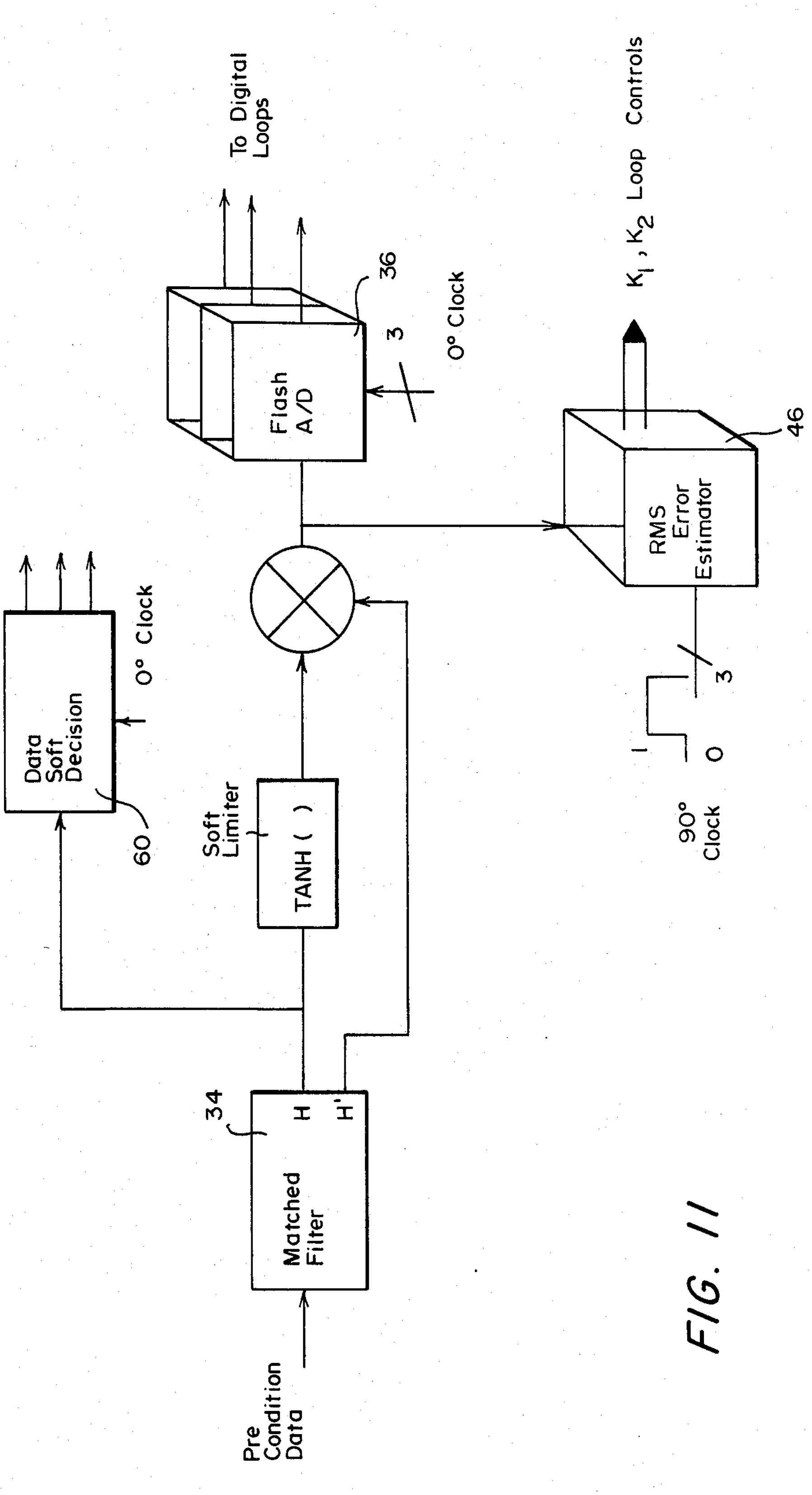
FIG. 11 is a schematic diagram of the RMS $\phi$ error and controller subsystems.

A controller is produced by sampling an A/D output of H' tanh $(H/N_o)$, but one needs a proportional signal to estimate rms phase error. This is accomplished by multiplying H' tanh $(H/N_o)$ with a 90° clock. This signal has been used as a controller in analog loops, however, it is used only for RMS $\phi$ error estimation. As mentioned above, the sampled H' tanh H is the best controller. FIG. 11 depicts this subsystem.

Offset must be measured when there are data transitions for NRZ and PM codes. Bi$\phi$ can be AC coupled.

Figure 12:
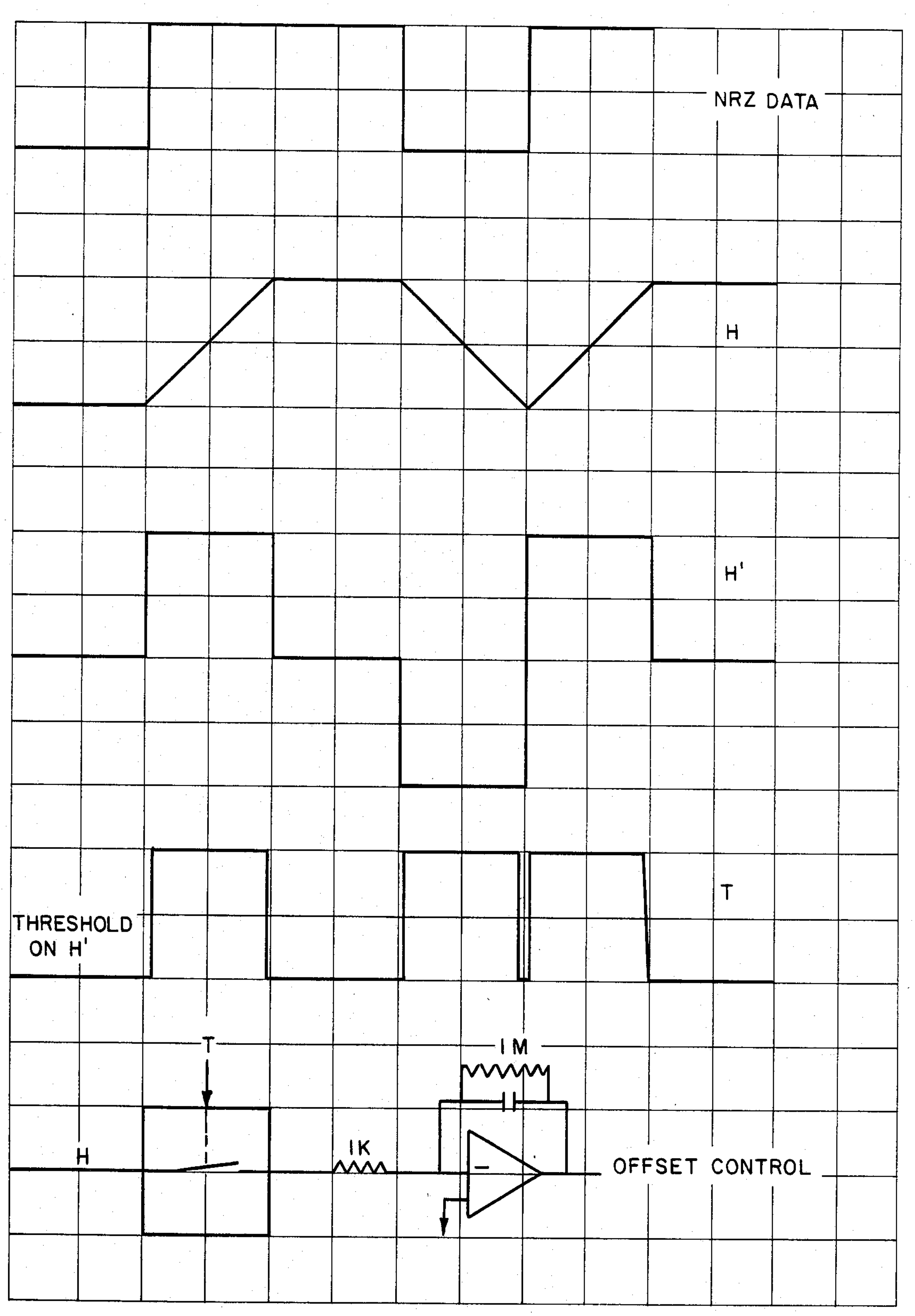
FIG. 12 is a tuning and circuit diagram for coherent offset control.

Threshold on H' for gating the offset measurement as depicted in FIG. 12.

For AGC, the gain is servoed so that the peak signals measured out of the matched filter fully load the A/D. This measurement will be done synchronously. Note that all of the other controls work long before perfect AGC is obtained.

It is important to servo the AGC on signal + noise. Clipping the large signals must be avoided because in any decoder which uses soft decisions the large signals contain most of the information.

The older method suggesteed in the Halpern ITC paper above for AGC is somewhat inferior. There one used the triangle waveforms out of Bi$\phi$ matched filters when NRZ is sent (and vice versa) to drive the AGC. This prior method fails to AGC on signal + noise and consequently loses transinformation with the soft decisions.

Considering now the DM codes, the synchronization of DM codes is the same as that for RZ, and the matched filter is data aided.

Figure 13:
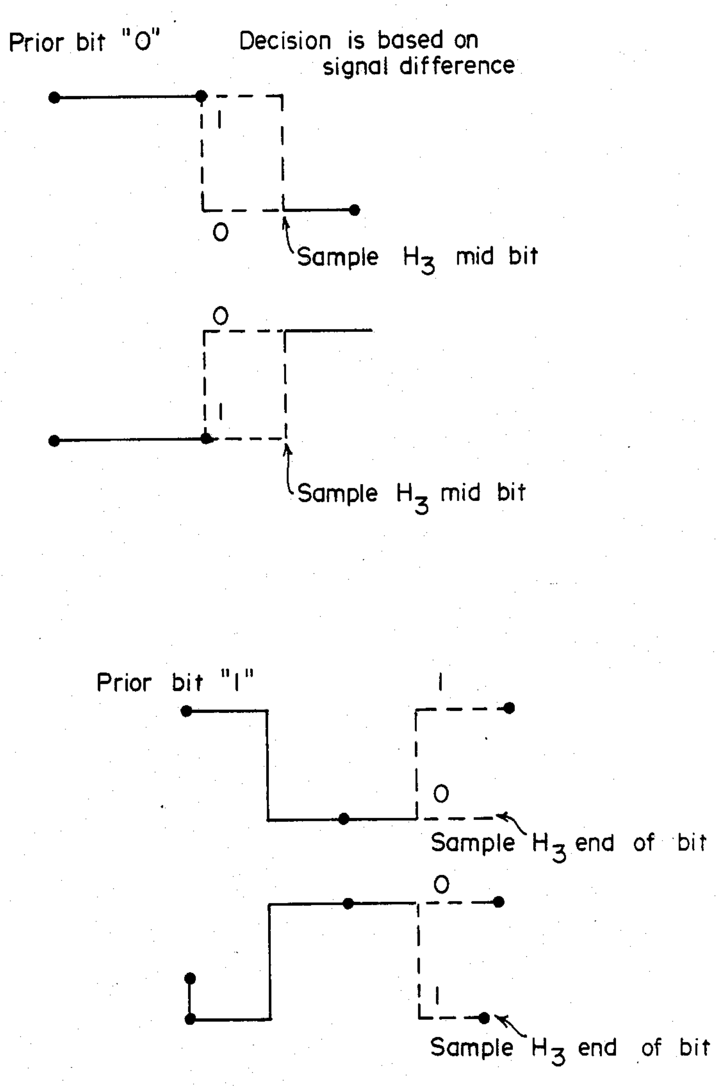
FIG. 13 illustrates the strategy for DM detection as dependent on the polarity and data of the prior bit.

FIG. 13 depicts the situation the bit decision depends on polarity and data of the prior bit.

Given knowledge of polarity and bit value of the prior bit the data decision is determined by sampling the output of the RZ matched filter. Alternatively, one could decide whether or not either polarity of Biϕ was more likely than either polarity of NRZ, i.e., take the largest in magnitude of the Biϕ or NRZ matched filters for the data decision. This latter method more than doubles the error rate but requires no data decision feedback.

For synchronization, $H_3$ and H are used and the system is synchronized at twice rate. A 4 ϕ divide-by-two then reconstructs the right clocks. The ambiguity is resolved by a sequential circuit similar to Biϕ. This circuit is discussed below.

The DM data can be most easily resolved by making a sequence of RZ bit decisions at twice bit rate and then mod 2 the RZ bits inside a DM bit. If the RZ bits are different then we had a transition center bit (a one for DM). If they are the same DM is a zero. Ambiguity is resolved every time we have a 101 pattern as depicted in the sketch.

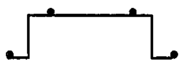

A SPRT, sequential probability ratio test is used for this and the Biϕ ambiguity as described below.

Considering now loop filters 38 and the numerically controlled oscillators 40 of FIG. 5, the synchronizer design of the present invention makes maximal use of the advantages of digital filtering. The digital filter has the following advantages over its analog counterpart:

(1) Bandwidth and damping parameters are independent of bit rate;

(2) The parameters are easily and accurately controlled; and (3) The design parameters are completely repeatable.

Furthermore, the digital loop is also always stable just like its analog counterpart.

Figure 14:
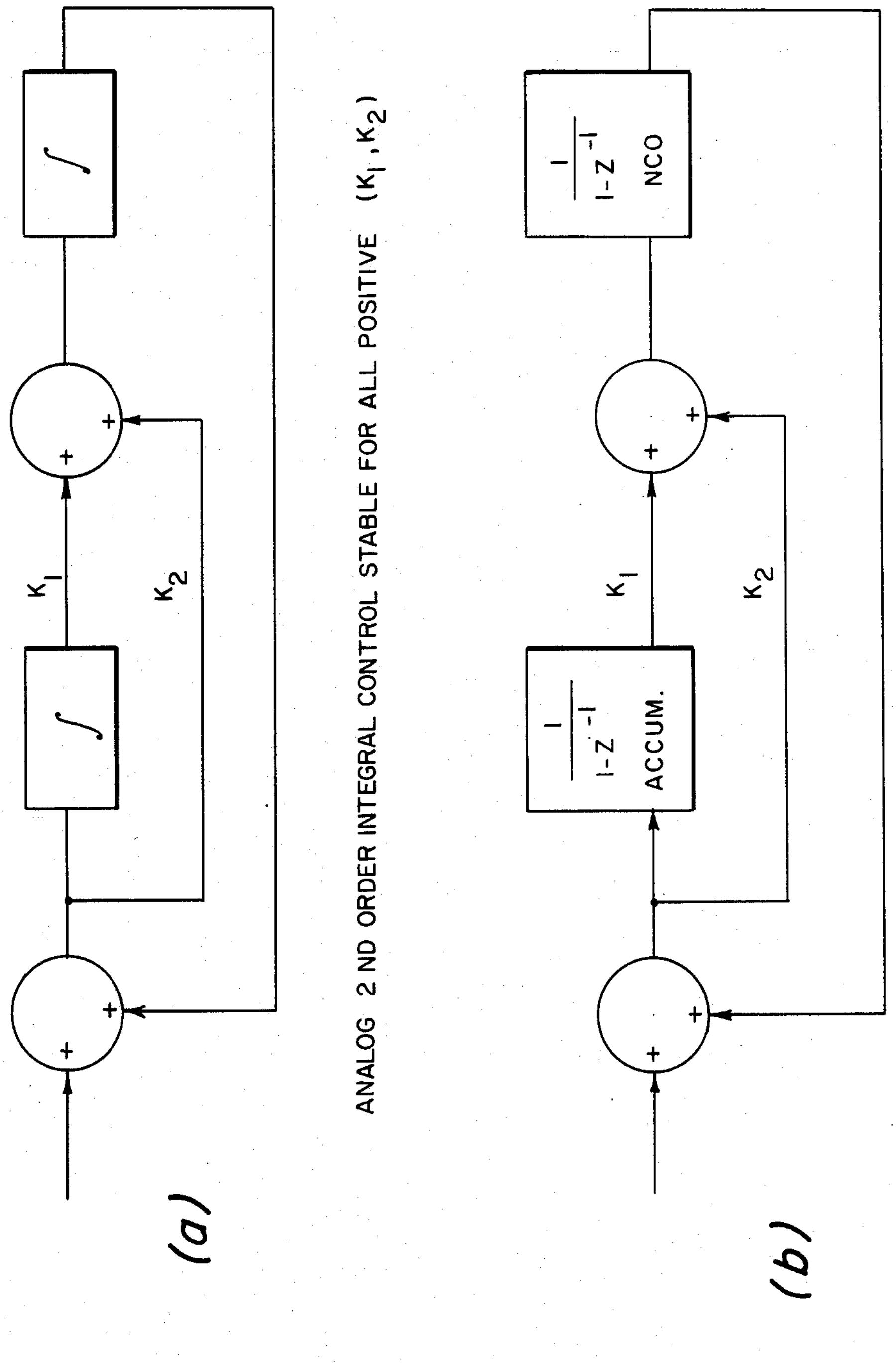
FIGS. 14 (*a* and *b*) are z domain block diagrams for the digital loop, illustrating the analog 2nd order integral control stable and the simplest digital version stable, respectively, for all positive ($K_1$,$K_2$)
Figure 15:
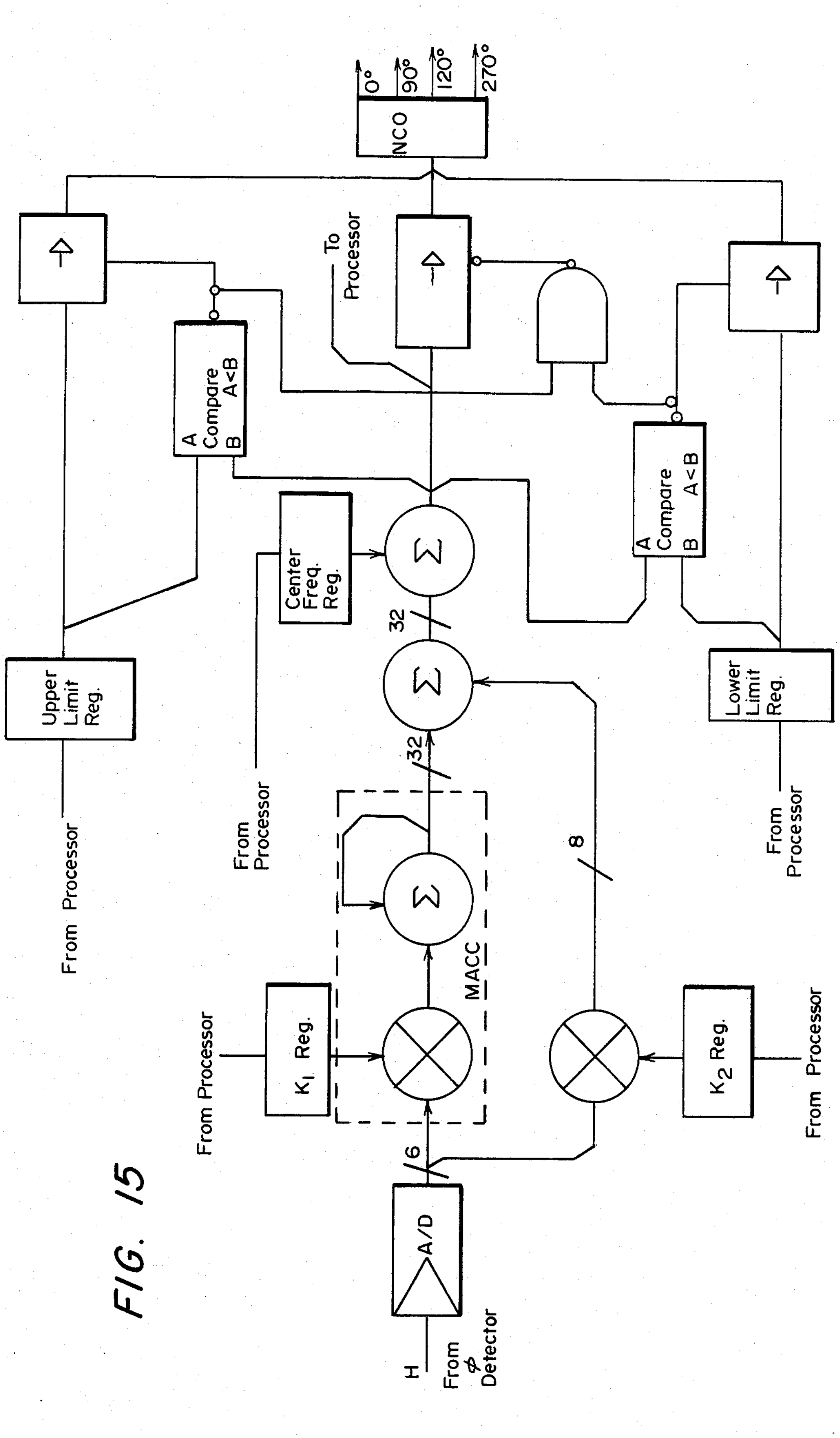
FIG. 15 is a digital calculation flow diagram for implementing the loop filter.

The digital loop gives the control over the system parameters which makes it easy to use parallel loops to measure the system performance change as a function of parameter change. The details of the digital loop are shown in FIG. 14, wherein the z domain block diagram for the digital loop is shown. The second integration is performed inherently by the Number Controlled Oscillator (NCO) just as a VCO would in a conventional loop. The first integrator, summers and multipliers must all be implemented in additional hardware. FIG. 15 is a diagram showing the flow of the digital calculations that must be performed to implement the loop. This diagram also shows logic for the programmable stops about the center of frequency. The hardware could be implemented exactly as shown using available technology for multipliers, multiplier-accumulators, and comparators. There is, however, new technology just becoming available which one can use to advantage in the ABS. A specific example is the 29300 family of 32 bit high performance parts from AMD. The family includes a multiplier, ALU, register files, and controller which can be combined to build a machine optimized for implementing the operations in a flow diagram with just a few VLSI parts. Since the loop must be implemented three times this is a worthwhile consideration.

The operation of the flow diagram is straight forward. A multiplier-accumulator (MACC) function implements the first integrator and the multiplication of the phase error input by K1. This is followed by a 32 bit adder which adds the MACC result with the result of K2 multiplied by the phase error input. At this point we have a delta frequency control signal. This is added with the nominal center frequency to form the composite signal for input to the NCO. This signal is compared to programmable upper and lower limits. If the composite signal is outside one of the limit settings then the limit setting is selected for the NCO input. Otherwise, the composite signal is the input for the NCO.

A microprocessor analyzes the error data and the front panel settings to set the system bandwidth, damping and center frequency parameters.

Figure 16:
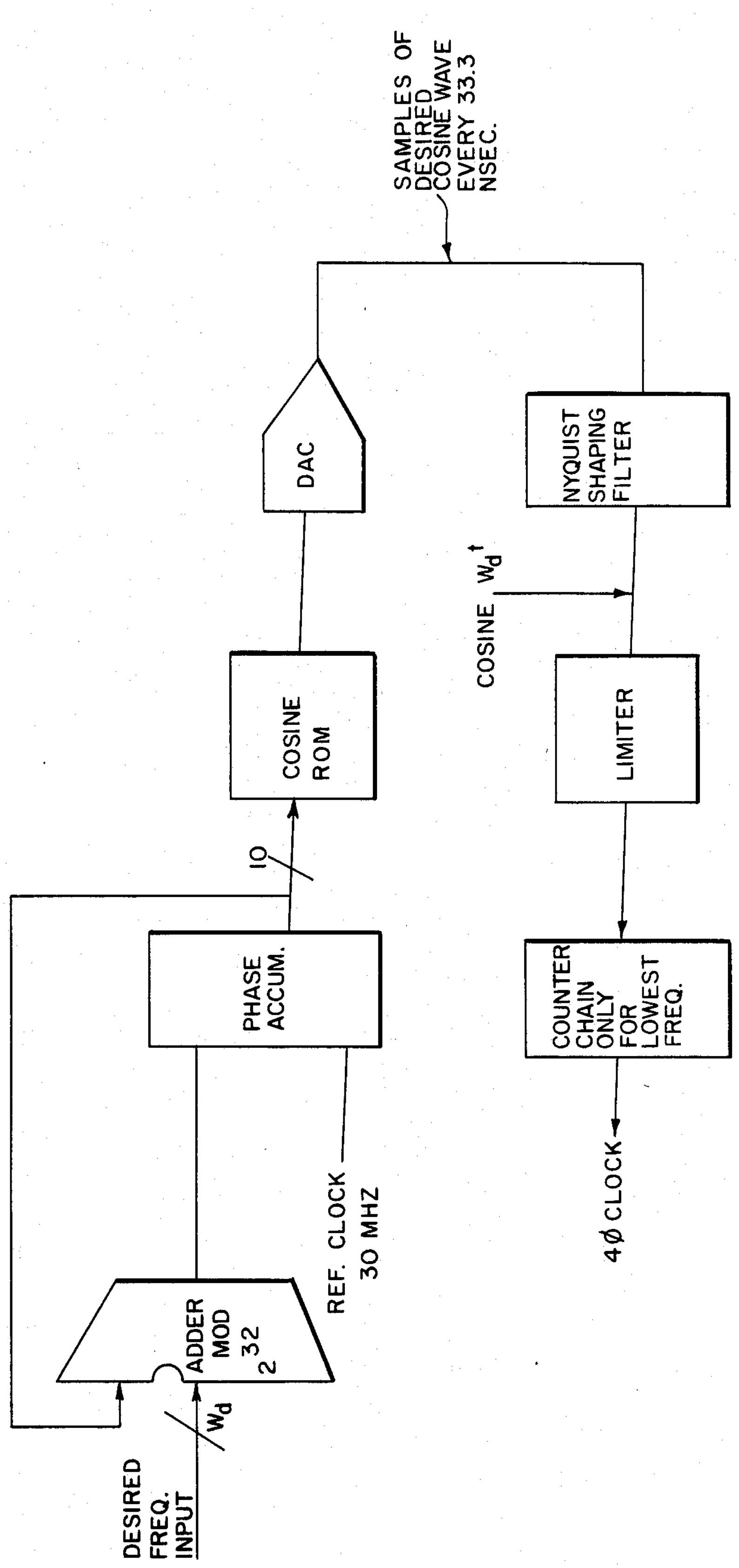
FIG. 16 is a block diagram for a typical number controlled oscillator (NC0)

A block diagram for a typical NCO is depicted in FIG. 16.

The NCO affords a simple and effective way of generating a frequency which is totally controlled by a digital number. Its frequency accuracy is as good as the crystal, which in the instant case is a VCXO for tape speed compensation (max deviation ±0.2%)

The accumulator in the NCO generates exact values of phase of the desired frequency at a rate which exceeds twice per cycle. Then a table from cosine ROM together with a DAC gives samples of the desired sine and cosine at more than twice per cycle. These samples are then passed through Nyquist shaping filters $(w\tau/\sin w\tau)^2$ compensating for the staircase input. The sampling theorem assures a faithful reproduction the desired sine wave. This is followed with a Johnson counter to produce the 4ϕ clock.

The versions of this device which are phase continuous will be used.

The primary reasons for its use are:

(1) the output frequency is drift free in the absence of a control signal. It remains at the last entered value;

(2) it is easily interfaced with the digital loop; and (3) little or no phase noise.

In the sequential circuits of unit 36 of FIG. 5, Biϕ and DM ambiguities are resolved, output code conversions are accomplished, and false locks are broken.

Figure 17A:
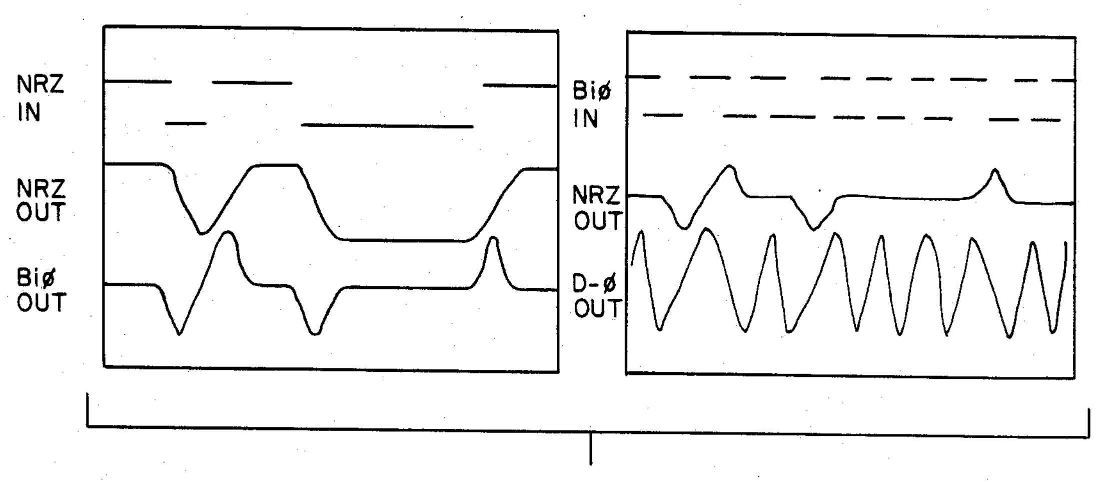
FIGS. 17 (*a* and *b*) are responses of two-pole pair and three-pole pair approximations, respectively, for detecting Biphase data transitions.
Figure 17B:
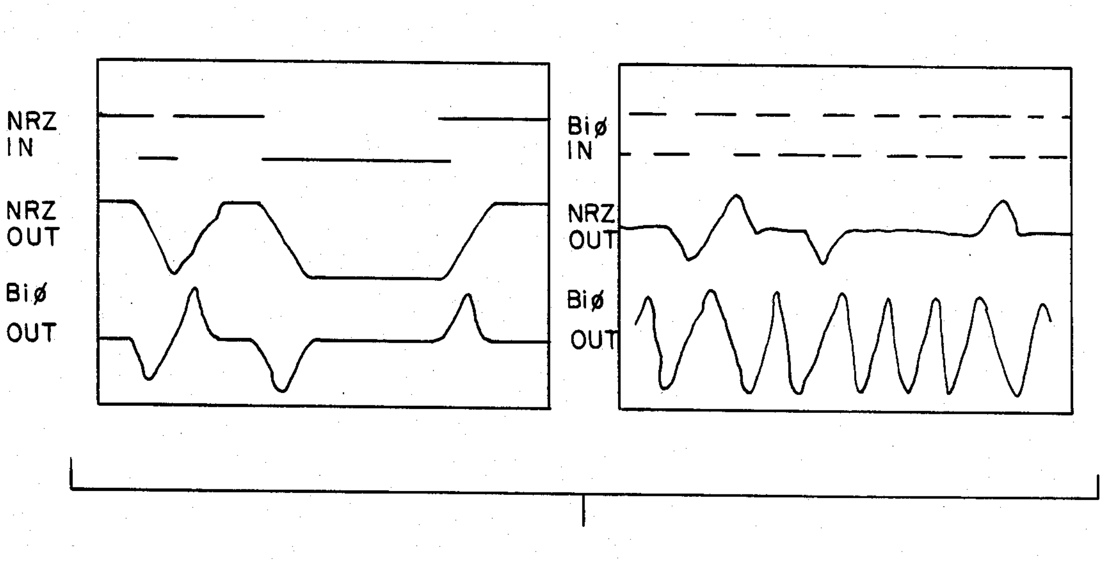

For Biϕ changes of digital data (not just changes in the waveform) are used to resolve ambiguity. To detect Biϕ data transitions the NRZ matched filter is used whose output is nearly zero except when data transitions are present. This event will also help break false locks. False locks are also broken for NRZ by observing the Biϕ matched filter. The situation is depicted in FIG. 17.

Figure 18:
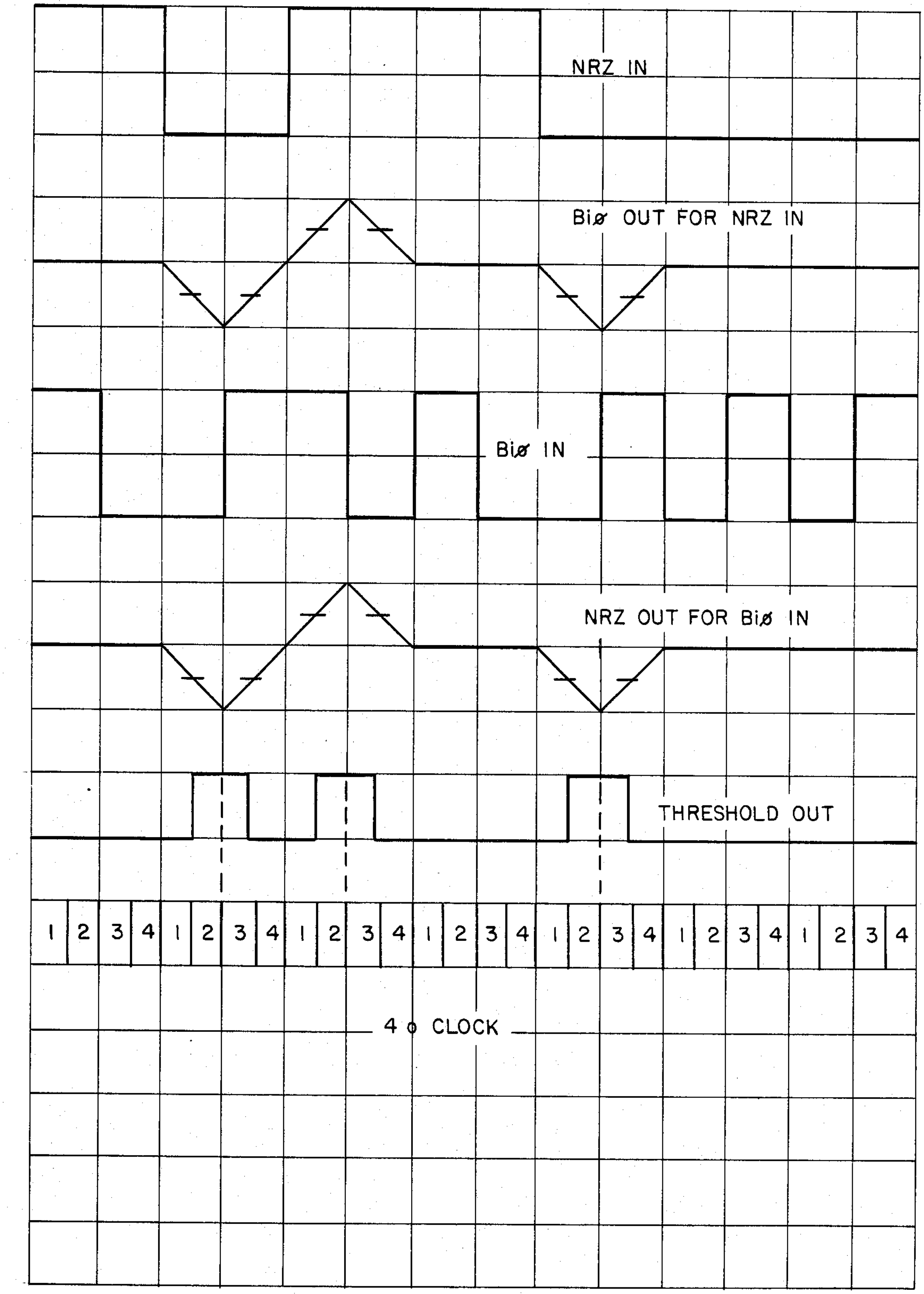
FIG. 18 is a timing diagram illustrating data transition detection from crossed matched filters.

For breaking false locks we use the fact that we would have a frequency error. Consequently the data transitions would be creeping through the various phases of the 4 phase clock. A detection of 1→2, 2→3, 3→4, 4→1 as shown in the timing diagram of FIG. 18 would detect a frequency error in one direction while the opposite state transition would detect a frequency error in the other direction. This transition would occur at a rate proportional to the frequency error. These frequency error indications are noisy and must be smoothed before they are fed into the PLL.

For Biϕ these data transition events are supposed to occur only between time zones 2 and 3. Occurrance between time zones 4 and 1 indicates a false lock. An up/down accumulation of these events resolves ambiguity. The up/down accumulator accumulates log probabilities of being in sync given the event "data transition during time zone". When the accumulator crosses a threshhold in the down direction the decision "out of sync" is made and the phase of the clock is reversed. When the system is in sync the accumulator will tend to remain at its upper limit.

A similar up/down accumulator of detecting a 101 pattern in DM code will resolve its ambiguity. Recall that for DM ocode, half bits are detected at twice the data rate. The RZ matched filter is used for this detection and samples it at 2 times data rate. The 101 data pattern results in four consecutive half bits with the same polarity. This pattern is unique and serves to resolve phase ambiguity as did the data transitions for Biφ. Neither RZ nor NRZ have a phase ambiguity problem.

Detecting false locks for DM codes is more difficult than for Biφ or NRZ.

If it is satisfactory, it could be assumed, for all rates lower than 2 MBPS, that the DM is 2 times data rate NRZ. Then all the false locks and ambiguity can be resolved using the Bi matched filter.

Evidently the only unique pattern is the 101 pattern which is an event that spans over 12 phases of the 4 phase clock. A sequential circuit is used for detecting the time zone creep of this event. The sequential circuit is standard in the art.

As a special consideration for R NRZ-L, it is a simple matter to reinsert the PN scrambler if one has a clear PN Bit with no data added that occurs periodically.

The SPRT test for doing this synchronization may be more than one needs.

First note that if one samples a linear PN sequence every Kth Bit (the bit that does not have data with it) one obtains a new linear PN sequence if K is a power of two it will be the same PN sequence. This bit may or may not be inverted if PSK or QPSK is the carrier. In any case we can synchronize and the re-generate the original scrambler, and resolve the ambiguity with a very simple system.

The synchronization is described as follows:

To obtain PN sequence codes for BPSK and QPSK frame synchronization and ambiguity resolution, non-maximal length PN sequences which are useful for frame synchronization and ambiguity resolution for BPSK and QPSK are easily derived.

If S(x) is a generator polynomial for a maximal length sequence, then $(1+x)S(x)$ will generate two separate complementary sequences, both of which satisfy the same recursion equation. This fact allows one to synchronize without regard to data inversions and simultaneously resolve the ambiguity for BSPK. This particularly useful for distributed frame synch. Decoded states of the synchronizer shift register will continually resolve the ambiguity.

Similarly $(1+x^2)S(x)$ will generate complementary sequences. But also every other bit can be complemented and still satisfy the recursion equation. This allows for all the ambiguities of QPSK and the resolution is again accomplished by decoding states of the shift registers.

In order to accomodate the ambiguities fo BPSK, the complement sequence must be a distinct sequence which satisfies the recursion equation. In this manner the same hardware can be used independent of the ambiguity and the ambiguity can be resolved by decoding states of the sequence.

Let $P_n(X)$ be a primitive generator polynomial of $n^{th}$ degree for a maximal length sequence. Then there are two sequences which satisfy the recursion equation. One will have length $2^n-1$ and the other will be the all zeroes sequence. Consider the generator polynomial $(1+X)P_n(X)$.

It will have an even number of feedback terms consequently, if S(X) is a sequence which satisfies the recursion equation, so will its complement.

The all ones sequence will also satisfy the recursion equation. The fact that the complement sequence is distinct is clear if for nothing else it has a different number of ones in it than the original sequence.

A similar situation arises for staggered QPSK. If we assume that either half of the data can be complemented or both halves, or the I and Q channel interchanged at the detector output, we can accommodate these ambiguities by using a generator of the form $(1+X^2)P_n(X)$.

To see this, first note that the system is linear. Consequently, the sum of any sequences which satisfy the recursion equation will also satisfy the equation. The sequences which satisfy $1+X^2$ factor are the all zeroes sequence 00000. The all ones sequence 1111111 . . . alternate one-zero $C_1=101010101$ and alternate zero one $C_2=010101010$.

Therefore, any, both or neither alternate half of the sequence can be complemented.

Again, all the ambiguities can be resolved by decoding all the states on the register.

This method of ambiguity resolution has merit. This avoids all the error propagation of the differentially coded PCM nd allows one to use normally designed error correcting codes.

The same questions of mean time to synch and mean time to reject false synch can be asked about this method. The sequential test in this case has even more impressive simplicity advantage over a parallel correlator.

The frame synch codes which we are discussing are derived from a PN sequence. They can either be distributed every $k^{th}$ bit or can be in a block at the end (or beginning) of a frame.

The first reason one uses a PN sequence is for hardware simplicity. The PN sequence gives an algorithm for each bit in succession and considerably simplifies the correlation test. The second reason is for speed. A parallel correlator is more of a computational problem at high bit rates than a sequential comparison.

Figure 19:
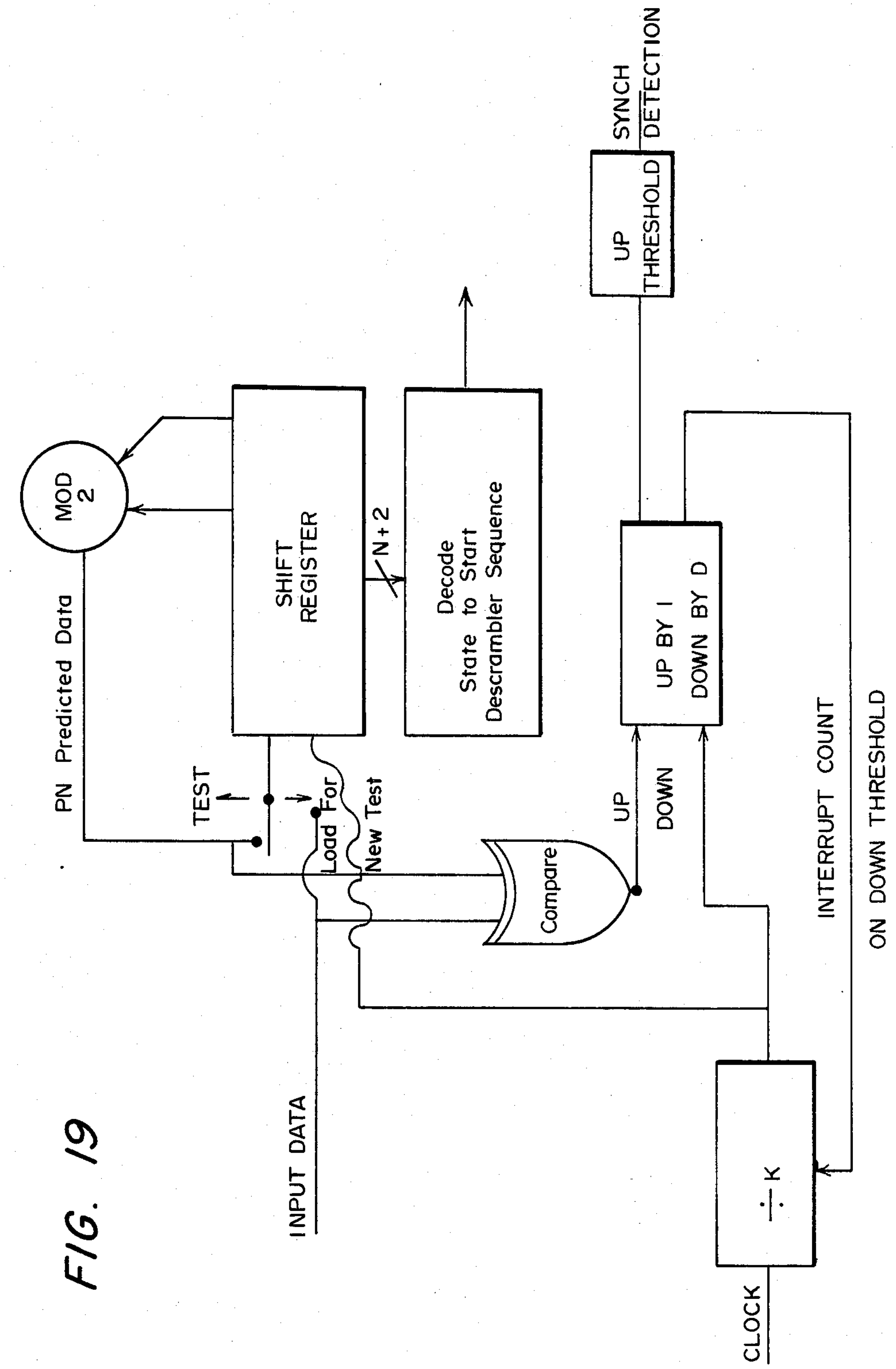
FIG. 19 is a block diagram of the sequential tester.

A typical sequential tester for distributed synch is shown in FIG. 19. The basic idea is to compute log probability that the system is in synch. As soon as the probability becomes less than a priori probability, a new synch point is tested.

Assuming all bit errors are independent and the data is uncorrelated with the PN sequence, then the sequential tester is simply an up-down counter. The idealized difference between up count and down count can be easily determined.

Let p be the probability of bit error.

Let $X_i$ be the result of the $i^{th}$ comparison test of the incoming bit with the PN predicted bit. The result will be a 1 if comparison is true and zero otherwise. Let P(S) represent the probability that we are in synch, $P(\bar{S})$ the complement.

Then the log likelihood $\tau$ that we are in synch given n comparisons can be expressed using Bayes Rules.

$$= \log \frac{P(S/X_1 \ldots X_n)}{P(\bar{S}/X_1 \ldots X_n)} = \log \frac{P_o(S)}{P_o(\bar{S})} + \log \frac{P(X_i/S)}{P(X_i/\bar{S})} \quad \text{(B1)}$$

The term log $[P_o(S)]/[P_o(\bar{S})]$ is the original (bias log likelihood of being in synch without any test.

Each term in the sum represents an increment in the counter. Suppose $X_i=1$, then the up count can be written $$U = \log \frac{P(X_i = 1/2)}{P(\bar{S}/X_i = 1)} = \log 2(1 - p)\log 2 \quad \text{(B2)}$$

and the down count can be written (as a negative number)

$$D = \log \frac{P(X_i = 0/S)}{P(X_i = 0/\bar{S})} = \log 2p \quad \text{(B3)}$$

In practice the up and the down count are usually chosen to be some power of 2 for convenience.

Some of the questions of interest in such a tester are (1) mean time to acquire (2) probability of rejecting false synch after m tests (3) probability of receiving n bits correctly to properly load the register after m bits These can all be handled using graph analysis and the simplest ideas of a Markov transition matrix.

The ideals can be generalized to include error correction on the PN sequence. The points in the frame can be obtained by decoding states of the register.

Referring again to FIG. 7, the circuit is designed to synthesize the transfer functions for NRZ or S$\phi$ of equations (14) and (15). More particularly, with regard to the denominator of equation (14), the first number "1" is provided from the output of operational amplifier 80 via feedback resistor 81, and the second term "2/S" is provided from the output of operational amplifier 88 via feedback resistor 89. The third term of the denominator is obtained from the output of operational amplifier 90 via feedback resistor 91, the output of operational amplifier 94 being fed back to the input of operational amplifier 84 via feedback resistor 95. Finally, the fourth term of the denominator is from operational amplifier 92 via feedback resistor 93, the output of operational amplifier 96 being fed back to the input of operational amplifier 86 via feedback resistor 87. In equation (15) for determining the first term of the numerator, the output is taken from operational amplifier 94, and the second term of the numerator is taken from the output of operational amplifier 96. Thus, simultaneous low sensitivity synthesis of all matched filters with derivatives is obtained from the circuit of FIG. 7.

What is claimed is:

1. An adaptive bit synchronizer for extracting digital data and its associated clock from a transmitted digital signal, comprising:

(a) means including a tunable matched filter set (34) for modifying the input signal to correct for deviations in offset and gain, said matched filter set including an input for receiving the digital signal, an output, and a data matched filter, a transition filter, and a derivative matched filter;

(b) means connected with the output of said matched filter set for generating a data output signal, said generating means including sampling means (60) for sampling the output of the data matched filter for making bit decisions and for estimating the reliability thereof;

(c) means connected with said matched filter set for producing at least two clocks, said clock producing means including:

(1) optimum phase detector means (36) for producing a plurality of estimates of the time error between the proper clock edge and the actual clock edges;

(2) loop filter means (38) for smoothing the estimates of the time error; and (3) controlled oscillator means responsive to the smoothed estimate of said loop filter means for generating clock signals, said sampling means and said optimum phase detector means being supplied with 0° clock signal;

(d) means connected with said optimum phase detector means and supplied with a 90° clock signal for providing means square phase error estimates; and (e) control means (48) responsive to said mean square phase error estimates of the clock signals for varying the loop parameters of said loop filter means to minimize means square phase error.

2. Apparatus as defined in claim 1, wherein said optimum phase detector means and said loop detector means include means for detecting and breaking false locks.

3. Apparatus as defined in claim 1, wherein said loop filter means includes means affording low sensitivity synthesis of all matched filters in accordance with the equations:

$$H_1(S) = \frac{2/S}{1 + \frac{2}{S} + \frac{4S}{S^2 + 4\pi^2} + \frac{46S/3}{S^2 + 24\pi^2}} \quad (14)$$

$$H_2(S) = \frac{\frac{16}{S^2 + 4\pi^2} + \frac{32/3}{S^2 + 24\pi^2}}{1 + \frac{2}{S} + \frac{4S}{S^2 + 4\pi^2} + \frac{46S/3}{S^2 + 24\pi^2}}, \quad (15)$$

respectively, wherein $H_1(S)$ and $H_2(S)$ are overall transfer functions.

* * * * *